(12) United States Patent
Kizaki

(10) Patent No.: US 7,307,750 B2
(45) Date of Patent: Dec. 11, 2007

(54) IMAGE FORMING APPARATUS, MEMORY CONTROL APPARATUS AND MEMORY CONTROL METHOD

(75) Inventor: Osamu Kizaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 984 days.

(21) Appl. No.: 10/355,108

(22) Filed: Jan. 31, 2003

(65) Prior Publication Data

US 2003/0161005 A1    Aug. 28, 2003

(30) Foreign Application Priority Data

| Feb. 1, 2002 | (JP) | ............................ | 2002-025802 |
| Mar. 19, 2002 | (JP) | ............................ | 2002-075832 |
| Mar. 22, 2002 | (JP) | ............................ | 2002-081714 |
| Jul. 19, 2002 | (JP) | ............................ | 2002-211471 |
| Jan. 23, 2003 | (JP) | ............................ | 2003-015343 |
| Jan. 23, 2003 | (JP) | ............................ | 2003-015344 |
| Jan. 23, 2003 | (JP) | ............................ | 2003-015345 |

(51) Int. Cl.
*G06F 15/00* (2006.01)
(52) U.S. Cl. .................. 358/1.17; 358/1.16; 358/1.13; 358/404
(58) Field of Classification Search ............... 358/1.13, 358/1.16, 1.17, 404
See application file for complete search history.

(56) References Cited

U.S. PATENT DOCUMENTS

| 5,434,650 | A | 7/1995 | Nakahara et al. |
| 5,510,876 | A | 4/1996 | Hayashi et al. |
| 5,546,164 | A | 8/1996 | Hayashi et al. |
| 5,583,615 | A | 12/1996 | Hashimoto et al. |
| 5,694,201 | A | 12/1997 | Hayashi et al. |
| 5,784,663 | A | 7/1998 | Hayashi et al. |
| 5,812,900 | A | 9/1998 | Hashimoto et al. |
| 5,897,236 | A | 4/1999 | Hashimoto et al. |
| 5,915,156 | A | 6/1999 | Kizaki et al. |
| 5,966,564 | A | 10/1999 | Kizaki et al. |
| 6,026,255 | A | 2/2000 | Kizaki et al. |
| 6,122,457 | A | 9/2000 | Kizaki |
| 6,628,419 | B1* | 9/2003 | So et al. ..................... 358/1.16 |
| 6,876,466 | B1* | 4/2005 | Morikawa et al. ......... 358/1.17 |
| 7,034,961 | B2* | 4/2006 | Moriura et al. .............. 358/1.9 |
| 7,167,261 | B2* | 1/2007 | Iwasaki ..................... 358/1.15 |

FOREIGN PATENT DOCUMENTS

| JP | 56-84069 | 7/1981 |
| JP | 03-178466 | 8/1991 |
| JP | 05-162391 | 6/1993 |
| JP | 07-256952 | 10/1995 |
| JP | 09-307723 | 11/1997 |
| JP | 2000-137422 | 5/2000 |
| JP | 2000-253223 | 9/2000 |

* cited by examiner

*Primary Examiner*—Douglas Q. Tran
*Assistant Examiner*—Chan S. Park
(74) *Attorney, Agent, or Firm*—Oblon, Spivak, McClelland, Maier & Neustadt, P.C.

(57) ABSTRACT

An image forming apparatus forms an image on a recording medium based on an image data output from a page memory having a plurality of consecutive pages each having a predetermined size. The image forming apparatus calculates a number of pages of the page memory required to store an image data in the page memory, judges whether or not the calculated number of pages can be acquired in the page memory, and acquires the calculated number of pages of the page memory based on the judgement made.

13 Claims, 31 Drawing Sheets

■REQUEST SEQUENCE
① INPUT: I2, M
② OUTPUT: I1, M
③ INPUT: I2, C
④ OUTPUT: I1, C
⑤ INPUT: I2, Y
⑥ OUTPUT: I1, Y
⑦ INPUT: I2, K
⑧ OUTPUT: I1, K

| P1 | ① INPUT: I2, ACQUIRED BY M |
| P2 | ② OUTPUT: I1, ACQUIRED BY M |
| P3 | ③ INPUT: I2, ACQUIRED BY C |
| P4 | ④ OUTPUT: I1, ACQUIRED BY C |
| P5 | ⑤ INPUT: I2, ACQUIRED BY Y |
| P6 | ⑥ OUTPUT: I1, ACQUIRED BY Y |

PAGE MEMORY ACQUISITION STATE

FIG.20

INPUT: I2, M
INPUT: I2, C
INPUT: I2, Y
INPUT: I2, K

→ PAGE MEMORY ACQUISITION STATE

| P10 | VACANT |
|---|---|
| P9 | INPUT: I2, ACQUIRED BY Y |
| P8 | INPUT: I2, ACQUIRED BY Y |
| P7 | VACANT |
| P6 | INPUT: I2, ACQUIRED BY C |
| P5 | INPUT: I2, ACQUIRED BY C |
| P4 | VACANT |
| P3 | INPUT: I2, ACQUIRED BY M |
| P2 | INPUT: I2, ACQUIRED BY M |
| P1 | VACANT |

INPUT REQUEST: I2, M ENDS & PAGES P2, P3 RELEASED ⇩

| P10 | VACANT |
|---|---|
| P9 | INPUT: I2, ACQUIRED BY Y |
| P8 | INPUT: I2, ACQUIRED BY Y |
| P7 | VACANT |
| P6 | INPUT: I2, ACQUIRED BY C |
| P5 | INPUT: I2, ACQUIRED BY C |
| P4 | VACANT |
| P3 | VACANT |
| P2 | VACANT |
| P1 | VACANT |

2 PAGES ACQUIRED FROM VACANT PAGES P1 ~ P4 ⇩

| P10 | VACANT |
|---|---|
| P9 | INPUT: I2, ACQUIRED BY Y |
| P8 | INPUT: I2, ACQUIRED BY Y |
| P7 | VACANT |
| P6 | INPUT: I2, ACQUIRED BY C |
| P5 | INPUT: I2, ACQUIRED BY C |
| P4 | VACANT |
| P3 | VACANT |
| P2 | INPUT: I2, ACQUIRED BY K |
| P1 | INPUT: I2, ACQUIRED BY K |

FIG.21

INPUT: I2, M
INPUT: I2, C
INPUT: I2, Y
INPUT: I2, K
INPUT: I1, M
INPUT: I1, C
INPUT: I1, Y
INPUT: I1, K

⇒ PAGE MEMORY ACQUISITION STATE ⇒

| P10 | INPUT: I2, ACQUIRED BY K |
| --- | --- |
| P9  | INPUT: I2, ACQUIRED BY K |
| P8  | INPUT: I2, ACQUIRED BY Y |
| P7  | INPUT: I2, ACQUIRED BY Y |
| P6  | INPUT: I2, ACQUIRED BY C |
| P5  | INPUT: I2, ACQUIRED BY C |
| P4  | VACANT |
| P3  | INPUT: I2, ACQUIRED BY M |
| P2  | INPUT: I2, ACQUIRED BY M |
| P1  | VACANT |

INPUT REQUEST: I2, M ENDS & PAGES P2, P3 RELEASED ⇓

| P10 | INPUT: I2, ACQUIRED BY K |
| --- | --- |
| P9  | INPUT: I2, ACQUIRED BY K |
| P8  | INPUT: I2, ACQUIRED BY Y |
| P7  | INPUT: I2, ACQUIRED BY Y |
| P6  | INPUT: I2, ACQUIRED BY C |
| P5  | INPUT: I2, ACQUIRED BY C |
| P4  | VACANT |
| P3  | VACANT |
| P2  | VACANT |
| P1  | VACANT |

ACQUIRE VACANT PAGES P1 ~ P4 ⇓

| P10 | INPUT: I2, ACQUIRED BY K |
| --- | --- |
| P9  | INPUT: I2, ACQUIRED BY K |
| P8  | INPUT: I2, ACQUIRED BY Y |
| P7  | INPUT: I2, ACQUIRED BY Y |
| P6  | INPUT: I2, ACQUIRED BY C |
| P5  | INPUT: I1, ACQUIRED BY C |
| P4  | INPUT: I1, ACQUIRED BY C |
| P3  | INPUT: I1, ACQUIRED BY C |
| P2  | INPUT: I1, ACQUIRED BY M |
| P1  | INPUT: I1, ACQUIRED BY M |

IMAGE FORMING APPARATUS, MEMORY CONTROL APPARATUS AND MEMORY CONTROL METHOD

BACKGROUND OF THE INVENTION

This application claims the benefit of Japanese Patent Applications No. 2002-025802 filed Feb. 2, 2002, No. 2002-075832 filed Mar. 19, 2002, No. 2002-081714 filed Mar. 22, 2002, No. 2002-211471 filed Jul. 19, 2002, No. 2003-015343 filed Jan. 23, 2003, No. 2003-015344 filed Jan. 23, 2003 and No. 2003-015345 filed Jan. 23, 2003, in the Japanese Patent Office, the disclosures of which are hereby incorporated by reference.

1. Field of the Invention

The present invention generally relates to image forming apparatuses, memory control apparatuses and memory control methods, and more particularly to an image forming apparatus which stores input images in a page memory and processes the stored images for printing, and to a memory control apparatus and a memory control method which are suited for such image processing.

2. Description of the Related Art

In image forming apparatuses having the functions of a digital copying machine, facsimile machine, printer and scanner, a page memory is provided between an image input/output end and a secondary storage unit such as a hard disk drive (HDD), so as to compensate for a relatively low transfer rate of the HDD by the page memory having a high access speed.

An input image data is temporarily developed in the page memory, and the developed input image data is transferred to the secondary storage unit such as the HDD. When outputting the image data, the image data stored in the HDD is developed in the page memory, and the developed image is output. Hence, the page memory functions as an intermediate buffer.

Recently, it has become necessary for the image forming apparatuses described above to process a color image data. As a result, the number of colors which need to be input and output has increased, and a page memory management has become complex. For example, it is necessary to output image data of magenta (M), cyan (C), yellow (Y) and black (K) which amounting to four times that of a black-and-white image data. For this reason, the page memory cannot be acquired for the image data input and output if the page memory management has discrepancies between the input and output, and it is impossible to input and output the image data in such a case. On the other hand, the page memory cannot have an extremely large storage capacity due to cost restraints, and there are demands to efficiently utilize the storage capacity of the page memory for the input and output of the image data or, at least for the output of the image data.

For example, a Japanese Laid-Open Patent Application No. 2000-253223 proposes an example of a method which improves the utilization efficiency of the page memory having a low utilization efficiency, by changing the image resolution. This proposed method judges whether or not the page memory overflows, and reduces the resolution by a resolution converting means if the page memory overflows. The image data having the reduced resolution is compressed and stored in the page memory, for use in forming the color image.

In addition to the image forming apparatuses provided with the secondary storage unit such as the HDD, there are image forming apparatuses having no secondary storage unit such as the HDD. In the case of the image forming apparatus provided with the secondary storage unit such as the HDD, it is possible to design the page memory control under a precondition that the page memory can be used if the image data can be saved in the HDD. But in the case of the image forming apparatus not provided with the secondary storage unit such as the HDD, there is no backup mechanism for the input image data, and the input image data must be stored in the page memory until the printing of the input image data is completed. Hence, the page memory can be used to store the next input image data only after the printing of the input image data stored therein is completed.

Suppose that a date is to be printed in red on a black-and-white document. In this case, a page memory corresponding to the black component is acquired based on the size of the input image data and the color component which is black. Hence, when printing the document, the black component of the input image data is developed in the acquired page memory and the black component can be printed, but the date cannot be printed in red because no page memory is yet acquired for the red component. In order to print the red component of the input image data, it is necessary to acquire the page memory therefor and develop the red component of the input image data in acquired the page memory.

There is no problem in printing the date in red, that is, the red component of the input image data, if the page memory has a sufficiently large storage capacity. However, if the storage capacity of the page memory is small, the page memory will become full by storing the black component of the input image data, and it will be impossible to acquire the necessary storage capacity to store the red component of the input image data in the page memory. This means that the required page memory resource cannot be acquired, and that the print job cannot be executed. On the other hand, if the secondary storage unit such as the HDD is provided in the image forming apparatus, even when the storage capacity of the page memory is small, the black component of the input image data stored in the page memory can be saved temporarily in the secondary storage unit such as the HDD to make the page memory available for storing the red component of the input image data.

SUMMARY OF THE INVENTION

Accordingly, it is a general object of the present invention to provide a novel and useful image forming apparatus, memory control apparatus and memory control method, in which the problems described above are eliminated.

Another and more specific object of the present invention is to provide an image forming apparatus, a memory control apparatus and a memory control method, which can efficiently manage a page memory so as to be able to cope with processing color images.

Still another object of the present invention is to provide an image forming apparatus which forms an image on a recording medium by an image forming section based on an image data output from a page memory, the page memory having a plurality of consecutive pages each having a predetermined size, the image forming apparatus comprising a page number calculating section calculating a number of pages of the page memory required to store an image data in the page memory; a judging section judging whether or not a calculated number of pages calculated by the page number calculating section can be acquired in the page memory; and a page memory acquiring section acquiring the calculated number of pages of the page memory based on a judgement made by the judging section. According to the image forming apparatus of the present invention, it is possible to prevent a situation where the required number of pages of the page memory cannot be acquired at the time of printing. In addition, it is possible to provide an optimum page memory management.

A further object of the present invention is to provide a memory control apparatus for managing pages of a page memory which has a plurality of consecutive pages each having a predetermined size and stores image data, comprising a page number calculating section calculating a number of pages of the page memory required to store an image data in the page memory; a judging section judging whether or not a calculated number of pages calculated by the page number calculating section can be acquired in the page memory; and a page memory acquiring section acquiring the calculated number of pages of the page memory based on a judgement made by the judging section. According to the memory control apparatus of the present invention, it is possible to prevent a situation where the required number of pages of the page memory cannot be acquired at the time of printing. In addition, it is possible to provide an optimum page memory management.

Another object of the present invention is to provide a memory control method for managing pages of a page memory which has a plurality of consecutive pages each having a predetermined size and stores image data, comprising calculating a number of pages of the page memory required to store an image data in the page memory; judging whether or not the calculated number of pages can be acquired in the page memory; and acquiring the calculated number of pages of the page memory based on the judgement. According to the memory control method of the present invention, it is possible to prevent a situation where the required number of pages of the page memory cannot be acquired at the time of printing. In addition, it is possible to provide an optimum page memory management.

Still another object of the present invention is to provide an image forming apparatus which forms an image on a recording medium by an image forming section based on an image data output from a page memory, where the page memory has a plurality of consecutive pages each has a predetermined size, and the image forming apparatus comprises a page number calculating section calculating a number of pages of the page memory required to store an image data in the page memory; a grouping section grouping the pages of the page memory into page groups each having a number of consecutive pages corresponding to a calculated number of pages calculated by the page number calculating section; and a page memory acquiring section acquiring pages of the page memory in units of page groups. According to the image forming apparatus of the present invention, it is possible to further improve the utilization efficiency of the page memory, because the acquisition of the pages of the page memory is made in units of page groups, thereby facilitating the page memory management and avoiding random or scattered use of the pages of the page memory.

A further object of the present invention is to provide a memory control apparatus for managing pages of a page memory which has a plurality of consecutive pages each having a predetermined size and stores image data, comprising a page number calculating section calculating a number of pages of the page memory required to store an image data in the page memory; a grouping section grouping the pages of the page memory into page groups each having a number of consecutive pages corresponding to a calculated number of pages calculated by the page number calculating section; and a page memory acquiring section acquiring pages of the page memory in units of page groups. According to the memory control apparatus of the present invention, it is possible to further improve the utilization efficiency of the page memory, because the acquisition of the pages of the page memory is made in units of page groups, thereby facilitating the page memory management and avoiding random or scattered use of the pages of the page memory.

Another object of the present invention is to provide a memory control method for managing pages of a page memory which has a plurality of consecutive pages each having a predetermined size and stores image data, comprising calculating a number of pages of the page memory required to store an image data in the page memory; grouping the pages of the page memory into page groups each having a number of consecutive pages corresponding to a calculated number of pages; and acquiring pages of the page memory in units of page groups. According to the memory control method of the present invention, it is possible to further improve the utilization efficiency of the page memory, because the acquisition of the pages of the page memory is made in units of page groups, thereby facilitating the page memory management and avoiding random or scattered use of the pages of the page memory.

Still another object of the present invention is to provide an image forming apparatus which forms an image on a recording medium by an image forming section based on an output image data output from a page memory, where the page memory has a plurality of consecutive pages each has a predetermined size and storing an input image data and the output image data, and the image forming apparatus comprises a page memory acquiring section acquiring pages of the page memory for storing the input image data and the output image data; a selecting section selecting at least one of the pages acquired by the page memory acquiring section as an exclusive page which is used exclusively for storing the output image data; a setting section setting the page selected by the selecting section as the exclusive page; and a storage section storing the input image data stored in the page memory. According to the image forming apparatus of the present invention, it is possible to prevent a case where the pages of the page memory cannot be acquired for the image data of color components during a full-color printing, and to prevent a case where the page acquisition is delayed. As a result, it is possible to input and output the image data to and from the page memory in parallel by efficiently utilizing the pages of the page memory.

A further object of the present invention is to provide a memory control apparatus for managing pages of a page memory which has a plurality of consecutive pages each having a predetermined size and stores an input image data and an output image data, comprising a page memory acquiring section acquiring pages of the page memory for storing the input image data and the output image data; a selecting section selecting at least one of the pages acquired by the page memory acquiring section as an exclusive page which is used exclusively for storing the output image data; a setting section setting the page selected by the selecting section as the exclusive page; and a storage section storing the input image data stored in the page memory. According to the memory control apparatus of the present invention, it is possible to prevent a case where the pages of the page memory cannot be acquired for the image data of color components during a full-color printing, and to prevent a case where the page acquisition is delayed. As a result, it is possible to input and output the image data to and from the page memory in parallel by efficiently utilizing the pages of the page memory.

Another object of the present invention is to provide a memory control method for managing pages of a page memory which has a plurality of consecutive pages each having a predetermined size and stores an image data and an output image data, comprising acquiring pages of the page memory for storing the input image data and the output image data; selecting at least one of the acquired pages as an exclusive page which is used exclusively for storing the output image data; setting the selected page as the exclusive page; and storing the input image data stored in the page memory in a storage section other than the page memory. According to the memory control method of the present invention, it is possible to prevent a case where the pages of the page memory cannot be acquired for the image data of color components during a full-color printing, and to prevent a case where the page acquisition is delayed. As a result, it is possible to input and output the image data to and from the page memory in parallel by efficiently utilizing the pages of the page memory.

Other objects and further features of the present invention will be apparent from the following detailed description when read in conjunction with the accompanying drawings.

BRIEF DESCRIPTION OF THE DRAWINGS

FIG. 20 is a diagram for explaining a page memory acquisition which does not take grouping of the pages into consideration;

FIG. 21 is a diagram for explaining another page memory acquisition which does not take grouping of the pages into consideration;

DESCRIPTION OF THE PREFERRED EMBODIMENTS

First, a description will be given of a first embodiment of an image forming apparatus according to the present invention. This first embodiment of the image forming apparatus employs a first embodiment of a memory control apparatus according to the present invention, and a first embodiment of a memory control method according to the present invention.

Figure 1:
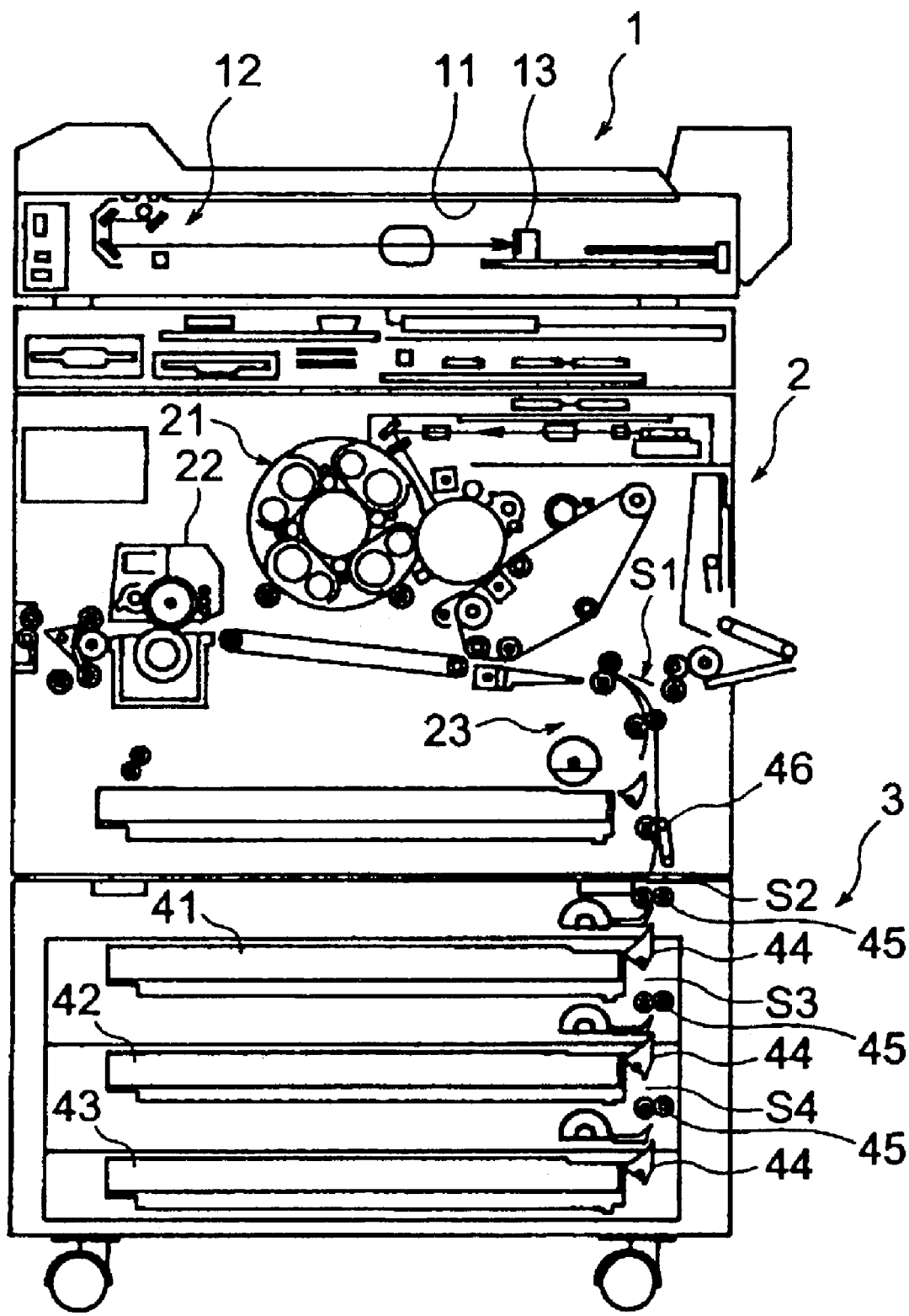
FIG. 1 is a diagram showing a general structure of a first embodiment of an image forming apparatus according to the present invention.
Figure 2:
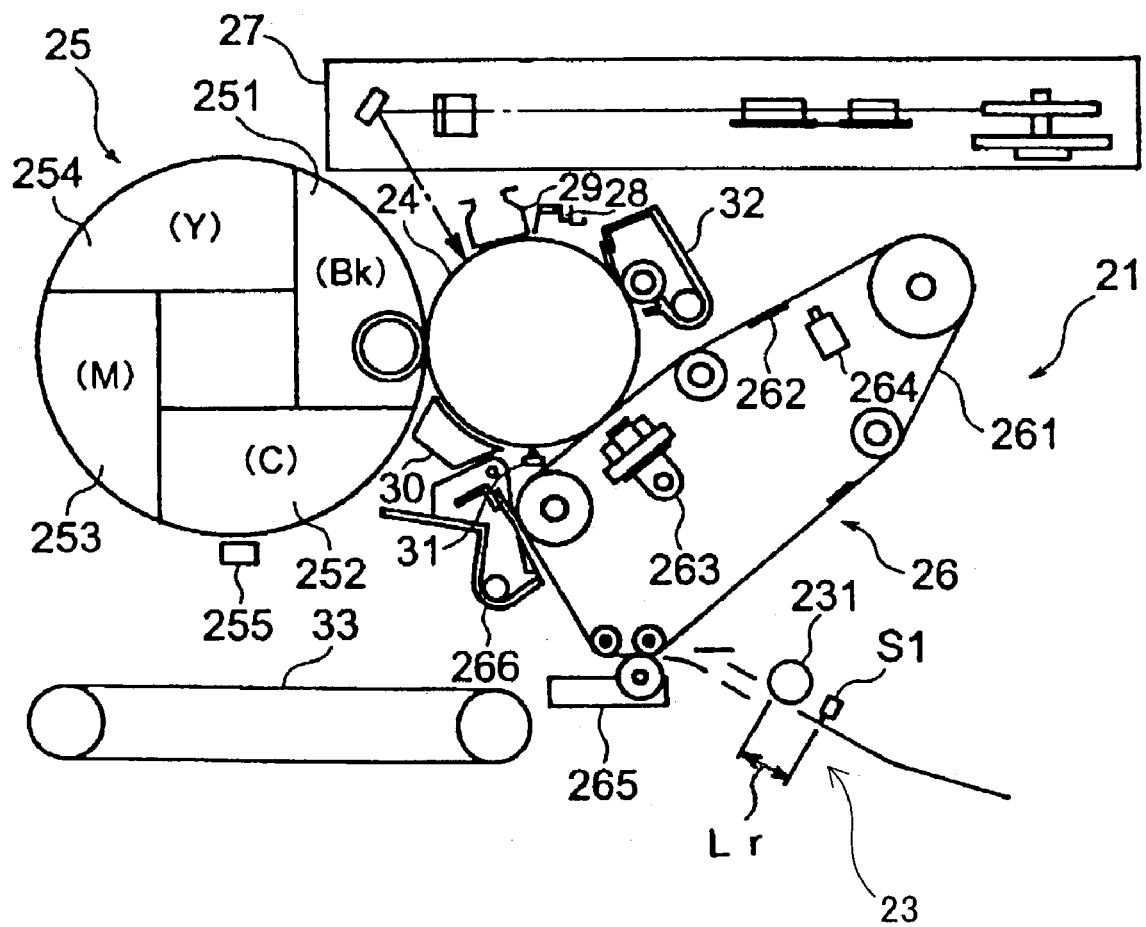
FIG. 2 is a diagram showing a structure of an image forming unit of the image forming apparatus shown in FIG. 1 on an enlarged scale.
Figure 3:
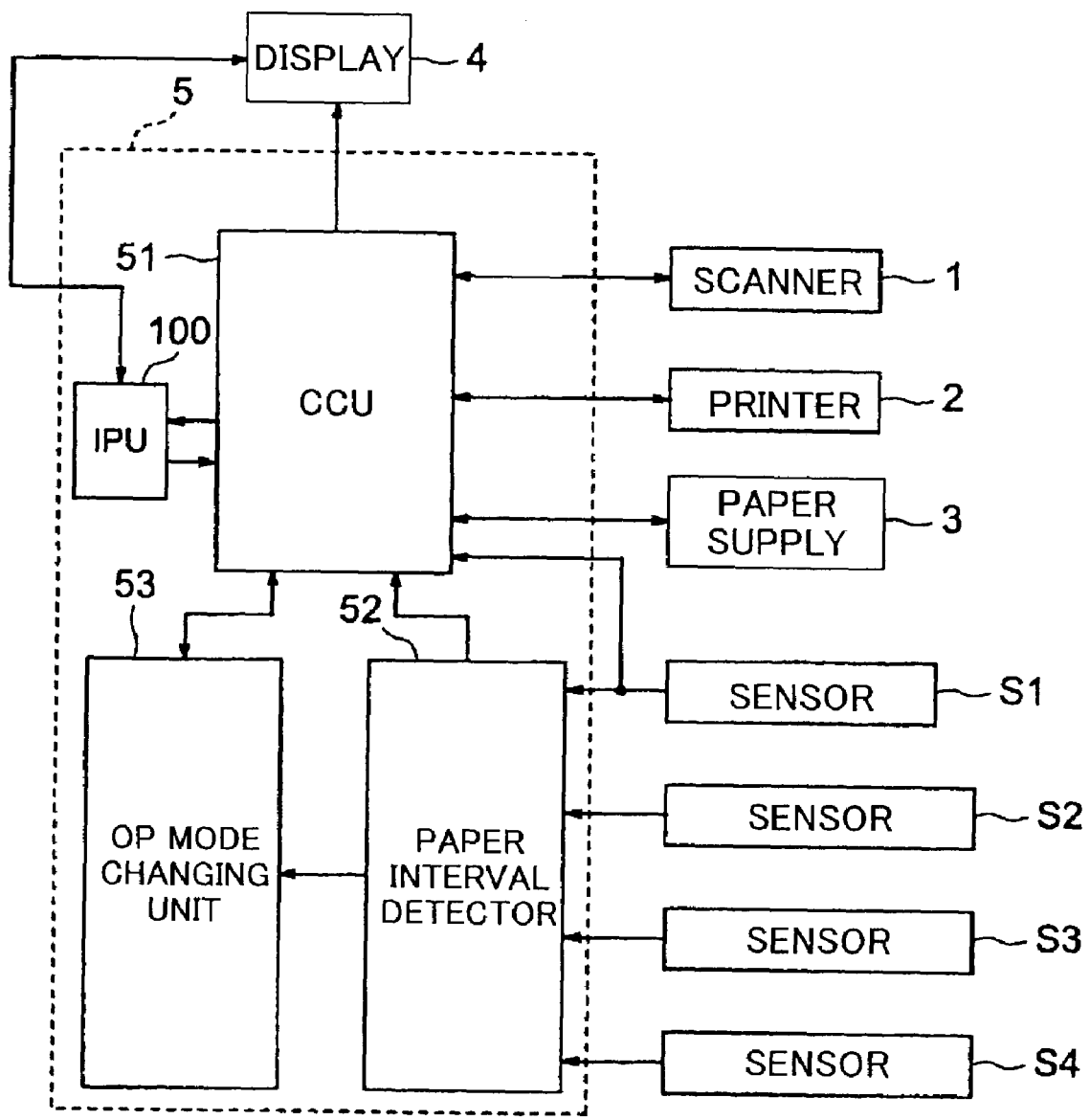
FIG. 3 is a system block diagram showing a structure of a controller of the image forming apparatus shown in FIG. 1.
Figure 4:
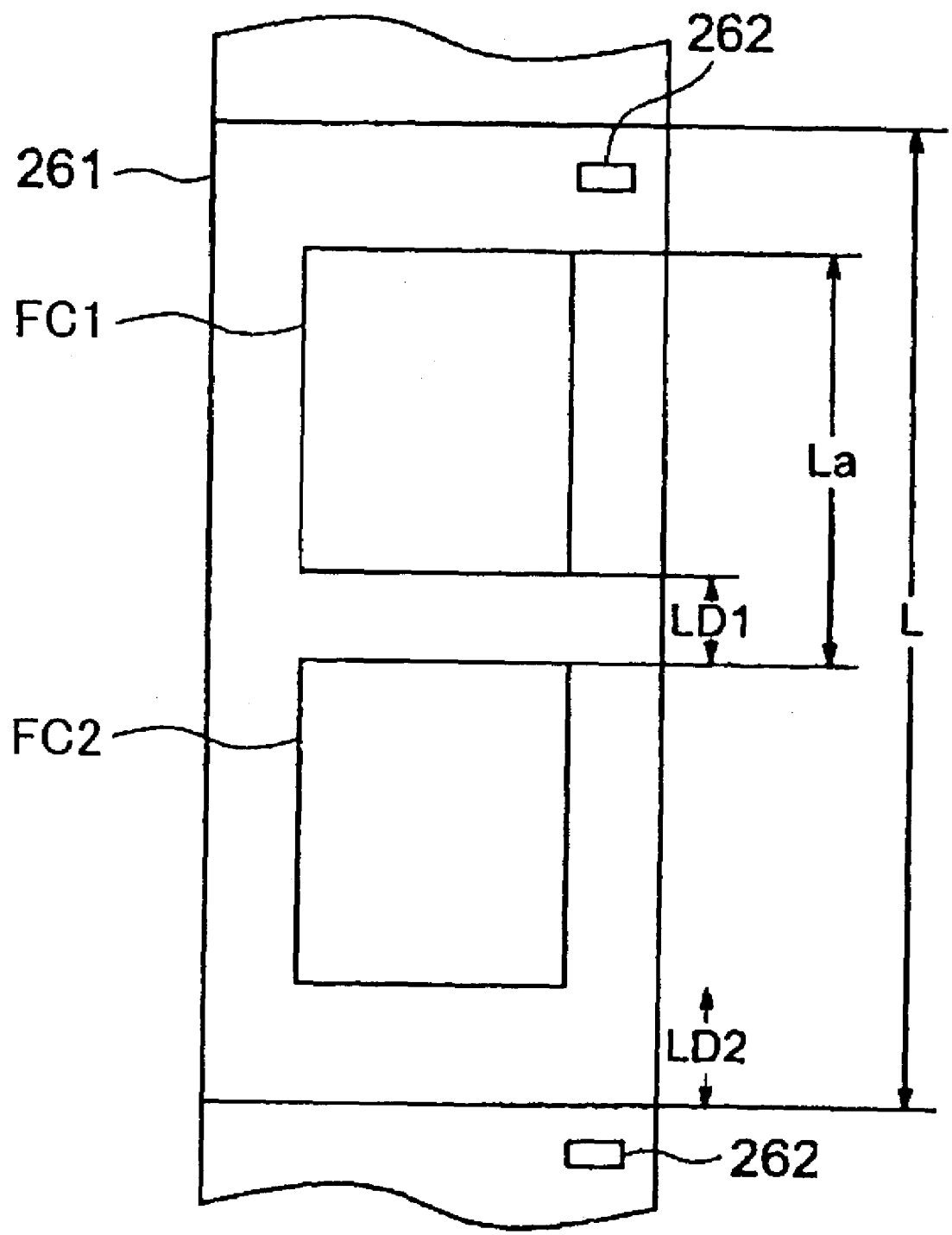
FIG. 4 is a diagram showing a development of two images transferred onto an intermediate transfer belt.
Figure 5:
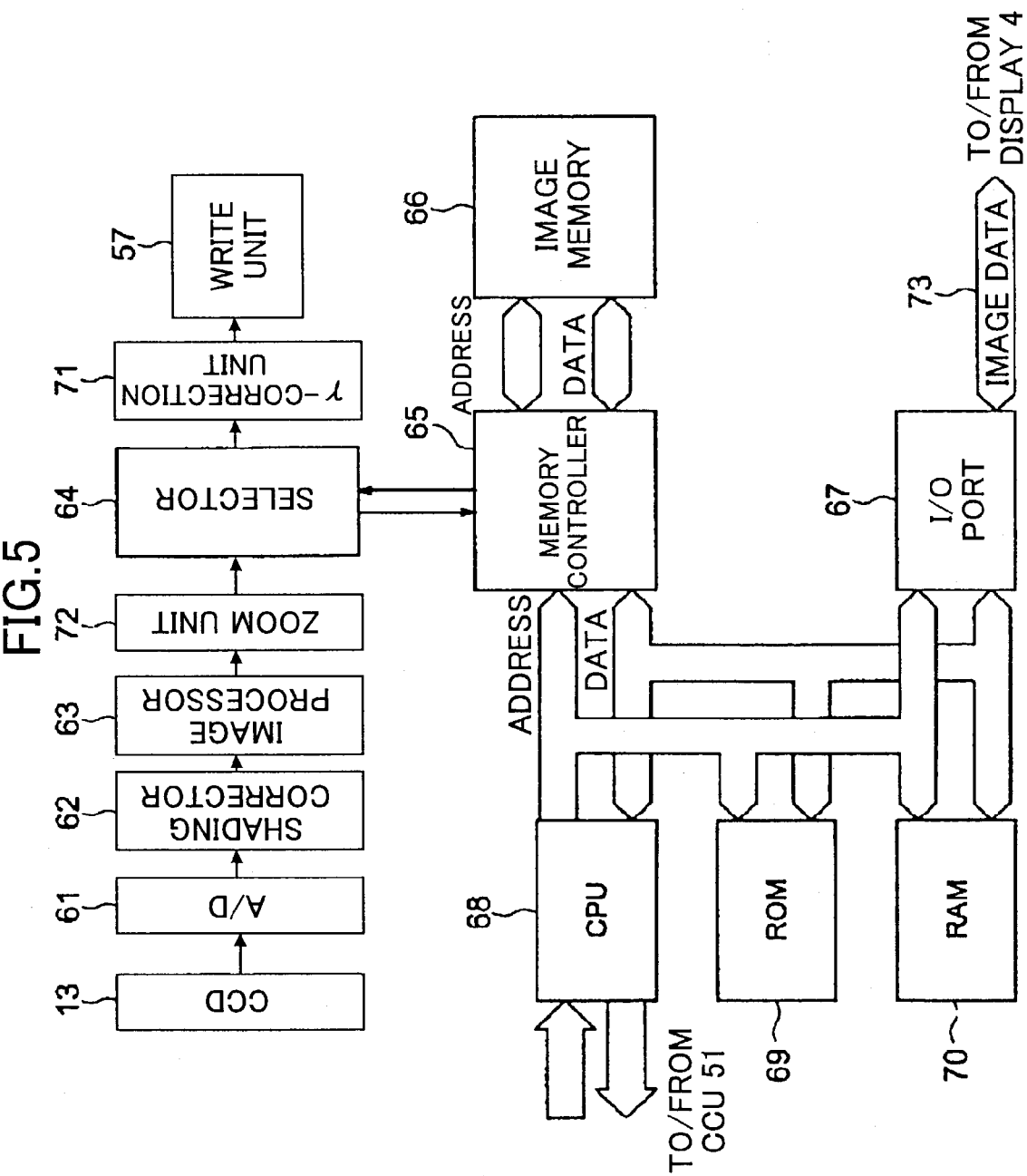
FIG. 5 is a system block diagram showing an internal structure of an image processing unit shown in FIG. 3.
Figure 6:
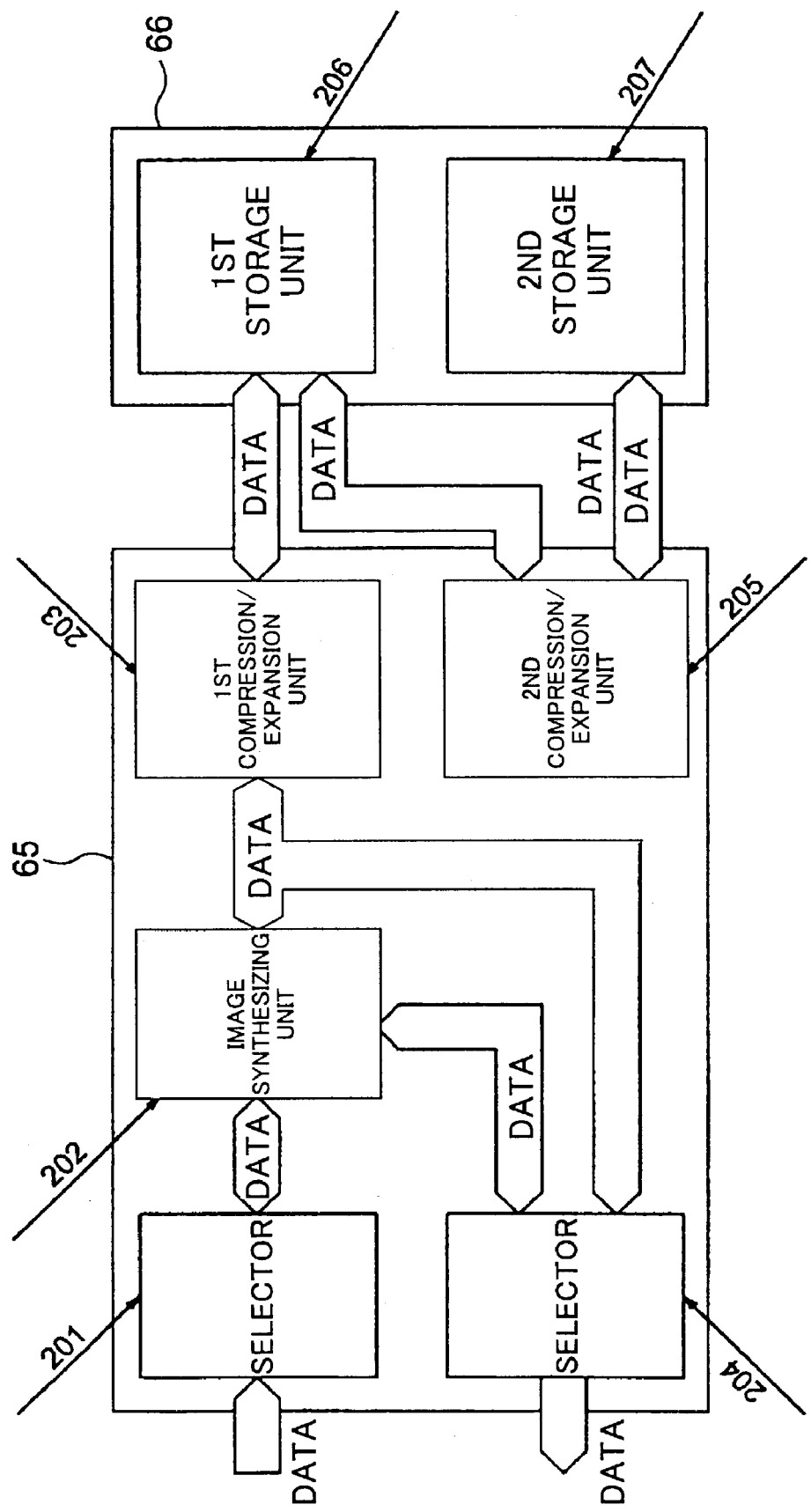
FIG. 6 is a system block diagram showing an internal structure of a memory controller and an image memory shown in FIG. 5.

FIGS. 1 through 6 are diagrams for explaining a structure of this first embodiment of the image forming apparatus. FIG. 1 is a diagram showing a general structure of the first embodiment of the image forming apparatus, and FIG. 2 is a diagram showing a structure of an image forming unit of the image forming apparatus shown in FIG. 1 on an enlarged scale. FIG. 3 is a system block diagram showing a structure of a controller of the image forming apparatus shown in FIG. 1. The controller shown in FIG. 3 corresponds to the first embodiment of the memory control apparatus. FIG. 4 is a diagram showing two images transferred onto an intermediate transfer belt. FIG. 5 is a system block diagram showing an internal structure of an image processing unit shown in FIG. 3, and FIG. 6 is a system block diagram showing an internal structure of a memory controller and an image memory shown in FIG. 5.

As shown in FIG. 1, the image forming apparatus includes a scanner section 1, a printer (or image forming) section 2 corresponding to an image forming means, and a paper supply section 3. In the scanner section 1, image information of a document which is placed on a contact glass 11 is sent to a color charge coupled device image sensor (hereinafter simply referred to as a color CCD) 13 by an optical scanning means (or section) 12 which includes a light source, a plurality of mirrors and a lens. The image information is decomposed into the colors red (R), green (G) and black (K) and read by the color CCD 13, and converted into electrical image signals.

The red (R), green (G) and black (K) image signals are subjected to a color conversion process in an image processor 63 shown in FIG. 5 which will be described later, and color components black (K), cyan (C), magenta (M) and yellow (Y) are sent from this image processor 63 to the printer section 2.

The printer section 2 includes an image forming unit 21, a fixing unit 22, and a recording paper transport unit 23. The image forming unit 21 includes a photoconductive body 24, a revolving unit 25, a transfer unit 26, and a write unit 27, as shown in FIG. 2. In addition, a discharge lamp 28, a charger 29, the revolver unit 25, a toner sensor 30, a pre-transfer discharge lamp 31, the transfer unit 26 and a drum cleaning unit 32 are provided in the printer section 2 along a rotating direction of the photoconductive body 24.

The revolver unit 25 includes a black (K) developer 251, a cyan (C) developer 252, a magenta (M) developer 253, a yellow (Y) developer 254, and a revolver home position sensor 255.

The transfer unit 26 includes an intermediate transfer belt 261 which has a reference mark 262 and is arranged around a plurality of rollers, a belt transfer charger 263, a mark sensor 264 which reads the reference mark 262, a paper transfer charger 265, and a belt cleaning unit 266.

The intermediate transfer belt 261 has a length amounting to two times the outer circumference of the photoconductive body 24, that is, amounting to two sheets of A4 size recording medium such as recording paper arranged side by side along the longer side, and an interval between the two sheets of recording paper, so that two images of the same color can be transferred onto the intermediate transfer belt 261 in two revolutions of the photoconductive body 24. A resist roller 231 which feeds the recording paper, and a tip end sensor S1 which is arranged a distance Lr on the upstream side of the resistor roller 231 and detects the tip end of the recording paper are provided in the recording paper transport unit 23 which is provided on the upstream side of the paper transfer charger 265.

Next, a description will be given of the paper supply section 3 shown in FIG. 1. The paper supply section 3 includes a plurality of paper supply trays 41, 42 and 43. Each of the paper supply trays 41 through 43 has a paper supply finger 44 and a paper supply roller 45, and recording paper sensors S2, S3 and S4 for detecting the recording paper are provided on the output side of the paper supply roller 45.

The recording paper supplied from the paper supply section 3 is transported to the recording paper transport unit 23 by a transport roller 46 which is provided on the output side of the paper supply roller 45.

Next, a description will be given of the controller 5 of the image forming apparatus, by referring to FIG. 3. A controller 5 shown in FIG. 3 controls operations of the scanner section 1, the printer section 2 and the paper supply section 3. The controller 5 includes a central control unit (CCU) 51 which displays an operation state and the like on a display unit 4, a recording paper interval detector 52, an operation mode changing unit 53, and an image processing unit (IPU) 100.

The recording paper interval detector 52 receives recording paper detection signals from the tip end sensor S1 which is provided in the printer section 2 and the recording paper sensors S2, S3 and S4 which are provided in the paper supply section 3. Based on the received recording paper detection signals, the recording paper interval detector 52 detects the interval between the rear end of the first recording paper which is transported and the tip end of the second recording paper which is transported, when forming the image in a 2-image mode in which two images are transferred onto the intermediate transfer belt 261.

When the interval between the first recording paper and the second recording paper detected by the recording paper interval detector 52 becomes larger than a predetermined reference value due to a timing delay, the operation mode changing unit 53 invalidates the 2-image mode, and changes the operation mode to a 1-image mode in which one image is transferred onto the intermediate transfer belt 261. Two images are formed during one revolution of the intermediate transfer belt 261 in the 2-image mode, but only one image is formed during one revolution of the intermediate transfer belt 261 in the 1-image mode.

Next, a description will be given of the process of forming one full-color image by the image forming apparatus described heretofore, by referring again to FIG. 2.

The image forming unit 21 rotates the photoconductive body 24 and the intermediate transfer belt 261 of the transfer unit 26. The image forming unit 21 starts reading the black (K) image data at a predetermined timing by detecting the reference mark 262 on the intermediate transfer belt 261 by the mark sensor 264 of the transfer unit 26. The optical write unit 27 writes an electrostatic latent image on the photoconductive body 24 based on the black (K) image data.

The electrostatic latent image on the photoconductive body 24 is visualized by the black (K) developer 251 of the revolver unit 25. The visualized black image K is transferred onto the intermediate transfer belt 261 by the belt transfer charger 263, at a timing based on the reference mark 262 which is detected from the intermediate transfer belt 261 by the mark sensor 264, thereby making a first transfer.

When the first transfer by the first color, namely, the black image K, ends, the revolver unit 25 rotates and the cyan (C) developer 252 contacts the photoconductive body 24. Thereafter, a cyan image C is visualized on the photoconductive body 24. The visualized cyan image C is transferred onto the intermediate transfer belt 261 by the belt transfer charger 263, at a timing based on the reference mark 262 which is detected from the intermediate transfer belt 261 by the mark sensor 264, thereby making a first transfer by the second color cyan. As a result, the cyan image C is overlapped on the black image K. Such an image formation and first transfer are carried out similarly with respect to a magenta image M and a yellow image Y. Hence, the cyan image C, the magenta image M and the yellow image Y are successively overlapped on the black image K, to form a full-color toner image on the intermediate transfer belt 261.

The full-color toner image transferred onto the intermediate transfer belt 261 is transferred by the paper transfer charger 265 onto the recording paper which is supplied from the recording paper transfer unit 23, thereby making a second transfer. The recording paper bearing the full-color toner image is supplied to the fixing unit 22 by the recording paper transport belt 33, and is ejected after being fixed by the fixing unit 22. The belt cleaning unit 266 contacts the intermediate transfer belt 261 which transfers the full-color toner image onto the recording paper by the second transfer Hence, the residual toner on the surface of the intermediate transfer belt 261 is removed by a belt cleaning element of the belt cleaning unit 266 and the surface of the intermediate transfer belt 261 is cleaned to prepare for the next image formation.

When forming the image in one color, the image formation is started without having to detect the reference mark 262, because it is unnecessary to overlap toner images of different colors on the intermediate transfer belt 261. When making this image formation, the process of writing the electrostatic latent image on the photoconductive body 24 at a predetermined timing, developing the electrostatic latent image, making the first and second transfers, and the cleaning of the intermediate transfer belt 261 are successively carried out. In addition, when continuously forming a plurality of images, the image formation is made at required image intervals, regardless of the revolution or revolution position of the intermediate transfer belt 261.

Next, a description will be given of the 2-image mode in which 2 full-color images are transferred onto the intermediate transfer belt 261. First, when the intermediate transfer belt 261 rotates and the mark sensor 264 detects the reference mark 262, a first black image K1 is formed on the photoconductive body 24. As shown in the development of FIG. 4, the first black image K1 is transferred onto the intermediate transfer belt 261 by the belt transfer charger 263 at a timing with reference to the detection of the reference mark 262 on the intermediate transfer belt 263 by the mark sensor 264, to thereby make the first transfer.

Then, a second black image K2 is formed on the photoconductive body 24. The second black image K2 is transferred onto the intermediate transfer belt 261 in a region subsequent to the region transferred with the first black image K1, to thereby make the first transfer. When the second transfer of the first and second black images K1 and K2 ends, the revolving unit 25 rotates, and the cyan developer 252 contacts the photoconductive body 24. Hence, a first cyan image C1 is formed on the photoconductive body 24. The first cyan image C1 is transferred onto the intermediate transfer belt 261 by the belt transfer charger 263 at a timing with reference to the detection of the reference mark 262 on by the intermediate transfer belt 263 by the mark sensor 264, to thereby make the first transfer. As a result, the first cyan image C1 is overlapped on the first black image K1.

Thereafter, a second cyan image C2 is formed on the photoconductive body 24. The second cyan image C2 is transferred onto the intermediate transfer belt 261 in a region subsequent to the region transferred with the first cyan image C1, to thereby make the first transfer. More particularly, the second cyan image C2 is overlapped on the second black image K2. The image formation and the first transfer are carried out similarly for the colors magenta and yellow, and as a result, a first full-color image FC1 and a second full-color image FC2 are transferred onto the intermediate transfer belt 261.

After the image formation in the final color yellow is started with respect to the first full-color image FC1, the resist roller 231 rotates at a predetermined second transfer timing. Hence, the first full-color image FC1 is transferred onto the recording paper by the second transfer and fixed, and then, the second full-color image FC2 is transferred onto the recording paper by the second transfer and fixed.

A description will now be given of the image formation control timing when forming the two full-color images FC1 and FC2 on the intermediate transfer belt 261, by referring to FIG. 4. In FIG. 4, La denotes a distance from a tip end of the first full-color image FC1 to a tip end of the second full-color image FC2.

When the distance La is set constant regardless of the length of the image, that is, the length of the recording paper to which the second transfer is made, it is possible to simplify the various image formation control timings regardless of the recording paper size.

A distance LD1 between the first full-color image FC1 and the second full-color image FC2, that is, the interval between the two sheets of recording paper transported in the 2-image mode, becomes a minimum when the length of each of the first and second full-color images FC1 and FC2 is equal to the longer side of the A4 size or the shorter side of the LT size. The longer side of the A4 size is the maximum length of the recording paper in the longitudinal direction of the intermediate transfer belt 261 when making the image formation in the 2-image mode.

The distance LD1 is determined to an operable length depending on a paper supply interval of the recording paper, a return speed of the scanner section 1, and the like. In addition, a distance LD2 from a terminal end of the second full-color image FC2 to a starting end of the intermediate transfer belt 261 indicated by the reference mark 262 does not affect the interval of the recording paper. The distance LD2 is determined by a color switching speed of the revolver unit 25, the return speed of the scanner section 1, and the like, and normally, LD1=LD2.

Next, a description will be given of an internal structure of the IPU 100, by referring to FIG. 5. Document image information from the optical scanning means 12 is photo-electrically converted in the color CCD 13, and is further converted into a digital image signal by an analog-to-digital (A/D) converter 61.

The digital image signal is subjected to a shading correction in a shading corrector 62, and is subjected to a MTF correction, γ-correction and the like in the image processor 63. The digital image signal is further subjected to a zoom process with an arbitrary magnification in a zoom unit 72. Hence, the digital image signal is enlarged or reduced depending on the arbitrary magnification and supplied to a selector 64.

The selector 64 selectively supplies the digital image signal to a write γ-correction unit 71 or a memory controller 65. The write γ-correction unit 71 subjects the digital image signal to a write γ-correction depending on image forming conditions, and supplies the digital image signal to a write unit 57. The digital image signal can be transferred bidirectionally between the selector 64 and the memory controller 65.

Although not shown in FIG. 5, the IPU 100 also has the function of inputting and outputting a plurality of data, so that external image data supplied from a data processing apparatus such as a personal computer may also be processed in addition to the image data input from the scanner section 1. The IPU 100 also includes a CPU 68 which makes the settings to the memory controller 65 and controls the scanner section 1 and the write unit 57, and a ROM 69 and a RAM 70 which are used to store programs and data.

The CPU 68 also writes data to and reads data from an image memory 66 via the memory controller 65. Image data 73 can be input and output bidirectionally via an input/output (I/O) port 67 between the display unit 4 or the like, and the memory controller 65 and the CPU 68.

Next, a more detailed description will be given of an internal structure of the memory controller 65 and the image memory 66 shown in FIG. 5, by referring to FIG. 6. FIG. 6 shows storage units forming the image memory 66, and respectively corresponding to a page memory and a storage means (or section).

The memory controller 65 includes an input data selector 201, an image synthesizing unit 202, a first compression and expansion unit 203, an output data selector 204, and a second compression and expansion unit 205. Control data are set to the data selectors 201 and 204, the image synthesizing unit 202, and the first and second compression and expansion units 203 and 205 from the CPU 68. The address and data shown in FIG. 5 are with respect to the image data, and the address and data supplied to the CPU 68 are not shown in FIG. 5. The memory controller 65 and the CPU 68 form a page number calculating means (or section), a judging means (or section), and a page memory acquiring means (or section).

The image memory 66 includes first and second (or main and secondary) storage units 206 and 207. The first storage unit 206 corresponds to a page memory.

A memory capable of making a high-speed access, such as a DRAM, is used for the first storage unit 206, so that the data write to a specified memory region and a data read from a specified memory region can be made approximately in synchronism with a data transfer rate requested when inputting and outputting the image data.

In this specification, a continuous page memory refers to a case where the addresses of the page memory amounting to 2 pages are arranged so that a page memory region not belonging to the 2 pages does not exist between a minimum address and a maximum address of the page memory amounting to the 2 pages.

The first storage unit 206 is used in common for storing the input image data to the image forming apparatus and the image data output to the printer section 2 which makes the image formation. The first storage unit 206 includes an interface part with respect to the memory controller 65 which divides the memory region of the first storage unit 206 into a plurality of pages having a predetermined size and simultaneously enables input and output of the image data to and from the first storage unit 206.

The second storage unit 207 corresponds to the storage means which may also function as a backup storage means. A non-volatile memory having a large memory capacity, such as a HDD, is used for the second storage unit 207, so that the input image data may be synthesized, sorted and stored by second storage unit 207. If the first storage unit 206 has a sufficiently large memory capacity for processing the image data and is non-volatile, it is unnecessary to input and output the image data to and from the second storage unit 207.

In a case where the second storage unit 207 is capable of writing and reading the image data approximately in synchronism with the data transfer rate requested when inputting and outputting the image data, it is possible to directly write and directly read the image data to and from the second storage unit 207. In such a case, the image data can be processed without distinguishing the first and second storage units 207.

On the other hand, in a case where the second storage unit 207 is not capable of writing and reading the image data approximately in synchronism with the data transfer rate requested when inputting and outputting the image data, the image data processing can be made depending on the data transfer capability of the second storage unit 207 by making the input and output of the image data to and from the second storage unit 207 via the first storage unit 206, even if a recording medium such as the hard disk and magneto-optical disk is used for the second storage unit 207.

A description will be given of particular cases where the first and second storage units 206 and 207 are used for various applications.

1) Making 1 Copy By Copy Application:

When making 1 copy, the image data from the scanner section 1 is input to the first storage unit 206, and output to the image forming unit 21 at approximately the same timing. At the same time, the image data is stored in the second storage unit 207. When the image formation ends normally, the image data stored in the second storage unit 207 is erased without being used. However, when a paper jam or the like is generated, the image data is read from the second storage unit 207, and the image formation can be made based on the image data read from the second storage unit 207.

2) Sorting (Making Plural Copies) By Copy Application:

When making 2 or more copies, the image data from the scanner section 1 is input to the first storage unit 206. When making the first copy, the image data is output from the first storage unit 206 to the image forming unit 21, and at the same time, the image data is stored in the second storage unit 207, similarly to the case 1) described above.

When making the second and subsequent copies, the image data is output from the second storage unit 207 to the first storage unit 206, and the image data is output from the first storage unit 206 to the image forming unit 21. Hence, the reading by the scanner section 1 is unnecessary for the second and subsequent copies. The image data stored in the second storage unit 207 is erased at a point in time when the required number of copies are made.

3) Image Storage From Scanner:

When storing the image data from the scanner section 1, the image data from the scanner section 1 is stored in the second storage unit 207 via the first storage unit 206. Unless intentionally erased, the image data remains stored in the second storage unit 207.

4) Printing From External Input Apparatus:

When printing the image data from the external input apparatus such as the personal computer, the operation is basically the same as that of the case 1) or 2) above, except that the image data is input from the external input apparatus and not from the scanner section 1.

5) Image Storage From External Input Apparatus:

When storing the image data from the external input apparatus such as the personal computer, the operation is basically the same as that of the case 3) described above, except that the image data is input from the external input apparatus and not from the scanner section 1.

6) Printing Stored Image:

When printing the image data stored in the case 3) or 5) above, the image data is output from the second storage unit 207 to the first storage unit 206, and the image data is output from the first storage unit 206 to the image forming unit 21 so as to print the image data.

Next, a description will be given of the operation of the memory controller 65. The description will be given of a case where it is not possible for the second storage unit 207 to write or read the image data approximately in synchronism with the data transfer rate requested when inputting or outputting the image data to or from the second storage unit 207.

First, a description will be given of the storage of the image data to the image memory 66.

Of the plurality of image data, the input data selector 201 selects the image data to be written into the first storage unit 206 within the image memory 66. The image data selected by the input data selector 201 is supplied to the image synthesizing unit 202 which processes the image data by synthesizing the image data if necessary. The processed image data from the image synthesizing unit 202 is compressed by the first compression and expansion unit 203, and the compressed image data is written in the first storage unit 206.

The image data stored in the first storage unit 206 is further compressed by the second compression and expansion unit 205 if necessary, and is then written in the second storage unit 207.

Next, a description will be given of the reading of the image data from the image memory 66.

When outputting the image data, the image data stored in the first storage unit 206 is read. In a case where the target image data to be output is stored in the first storage unit 206, the target image data read from the first storage unit 206 is expanded by the first compression and expansion unit 203. The expanded image data or, the image data obtained by synthesizing the expanded image data and the input image data, is selected by the output data selector 204 and output from the memory controller 65.

In a case where the target image data to be output is stored in the second storage unit 207, the target image data read from the second storage unit 207 is expanded by the second compression and expansion unit 205, and the expanded image data is written into the first storage unit 206 before outputting the image data in the above described manner.

Next, a description will be given of the input and output control of the image data using the page memory. The page memory is formed by the first storage unit 206, and temporarily stores the image data in units of pages, that is, in page units.

Normally, the page memory changes in size depending on the resolution and the like, but manages the memory capacity in units of A4 size as 1 page unit. For example, in a case where the input image data corresponds to an A3 size image, the image data is written using a memory capacity amounting to 2 pages of the page memory. Furthermore, in a case where the input image data is in color, the image data of the color components magenta (M), cyan (C), yellow (Y) and black (K) are obtained from the scanner section 1 and written in the corresponding pages of the page memory.

Similarly, when the color components of the image to be output, that is, printed, are stored in the page memory, the image data (color components) developed in the page memory are output to the printer section 2. If the specified color components are not stored in the page memory but are stored in the second storage unit 207, the image data (color components) are read from the second storage unit 207 to the page memory and then output to the printer section 2. In a case where the image forming apparatus is a color copying machine, the image forming apparatus is provided with a so-called automatic color select (ACS) mode which automatically judges the colors of the document image and selects whether the image is to be copied in black-and-white or full-color. Moreover, the document size and the size of the recording paper may be set judged and set automatically or, set by an operator of the image forming apparatus. The CPU 68 may make a reference to the document size and the recording paper size.

Next, a description will be given of the operation of this first embodiment of the image forming apparatus.

Figure 7:
FIG. 7 is a diagram for explaining an input/output wait state of a page memory.

FIG. 7 is a diagram for explaining input/output wait state of a page memory. It assumed for the sake of convenience that the page memory has a memory capacity amounting to 6 pages P1 through P6, and that the input and output requests are generated (or issued) in a sequence ① through ⑧ as indicated on the left side of FIG. 7. In FIG. 7, I1 and I2 denote image numbers of the image data, and Y, M, C and K denote color components of the image data. If the page memory is acquired in the sequence with which the input and output requests are generated as in the conventional case, the 6 pages P1 through P6 of the page memory are acquired in the sequence shown on the right side of FIG. 7, and the page memory cannot be acquired for the input request ⑦ and the output request ⑧. In other words, the acquisition of the page memory fails for the input request ⑦ and the output request ⑧. For this reason, the input request ⑦ and the output request ⑧ are in an input/output wait state, and must wait for a vacancy to occur until the page memory can be acquired.

Figure 8:
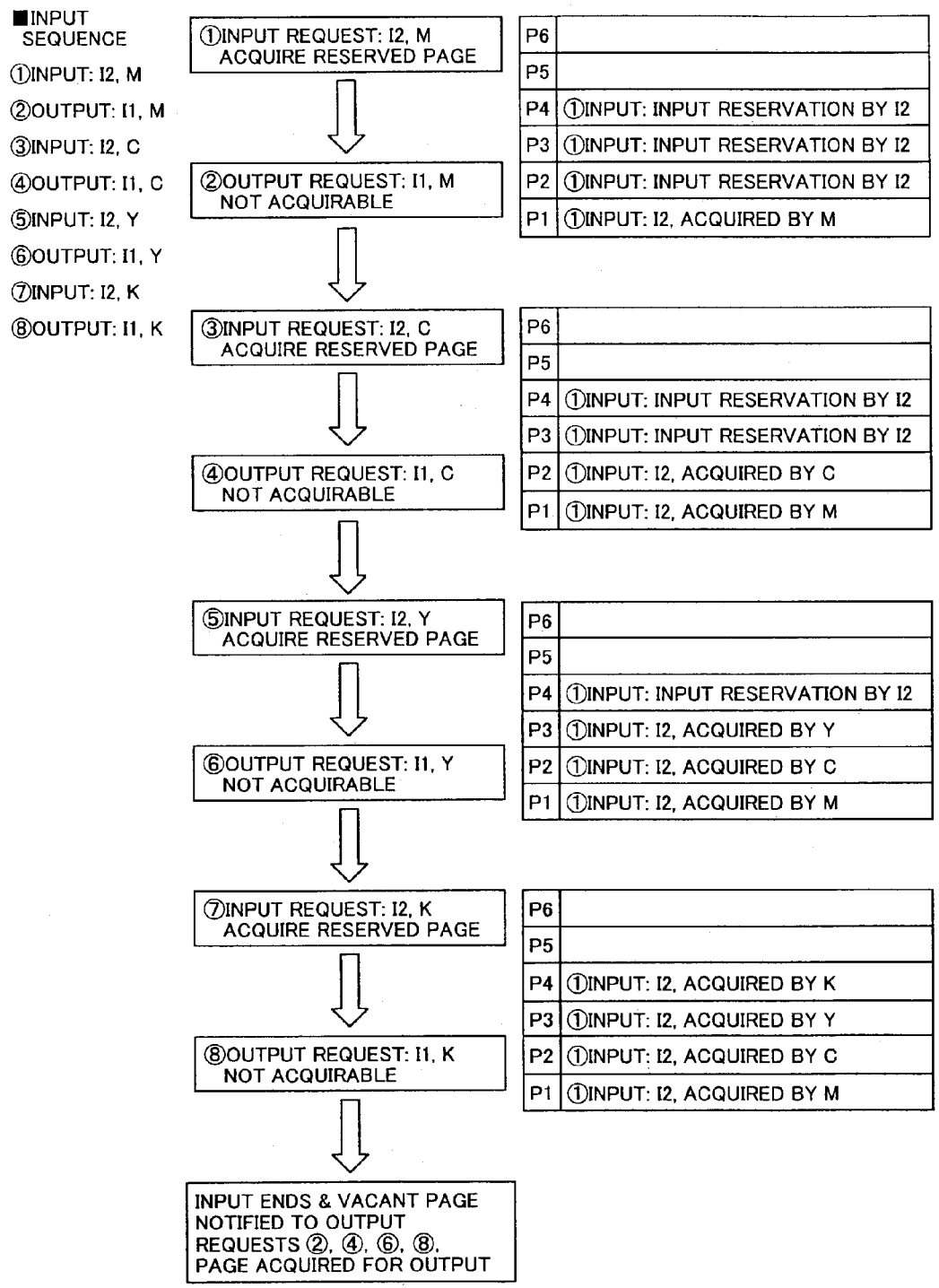
FIG. 8 is a diagram for explaining an acquisition, reserved state and an acquired state of the page memory for input and output.
Figure 9:
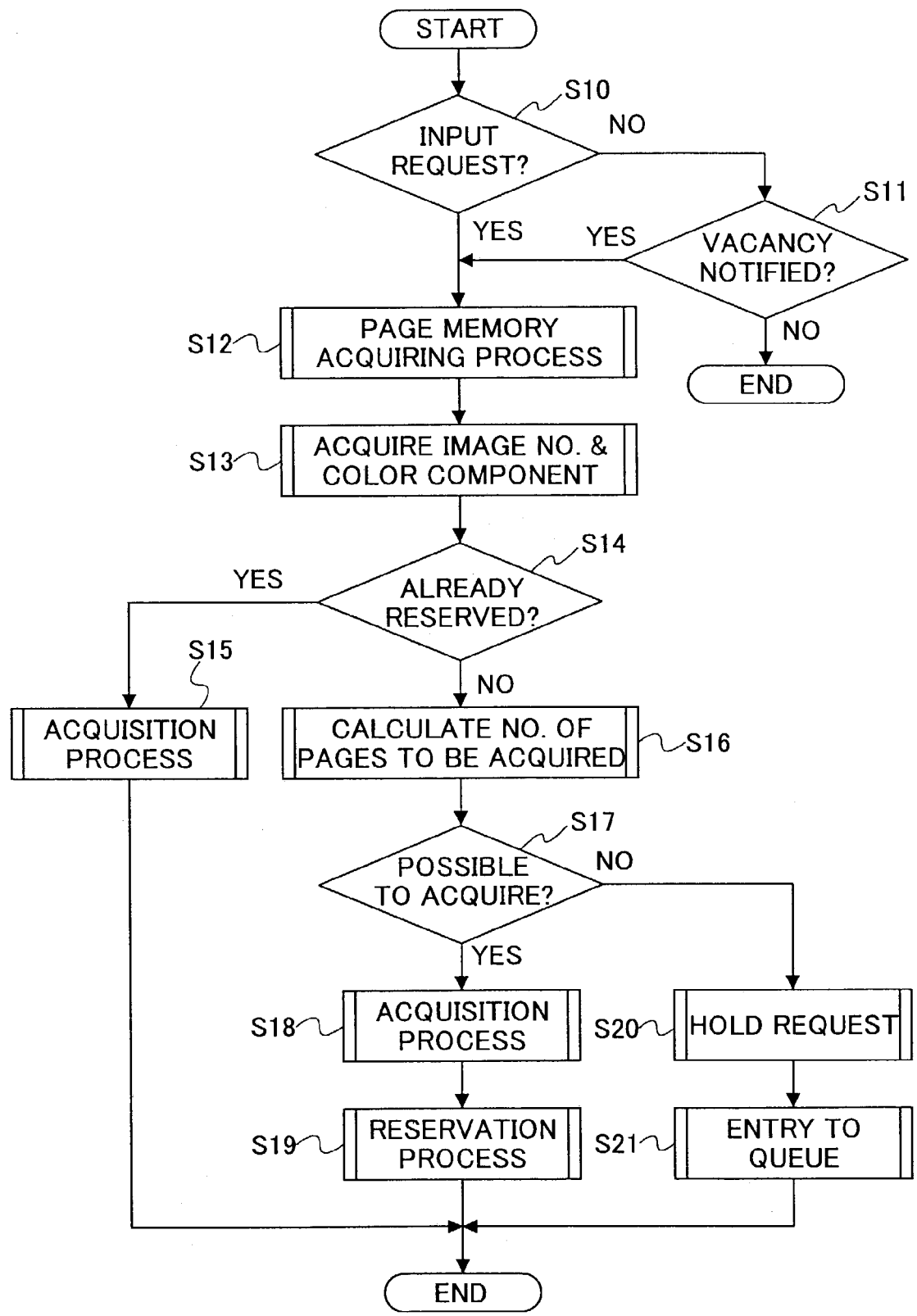
FIG. 9 is a flow chart for explaining a page memory acquiring process for input.
Figure 10:
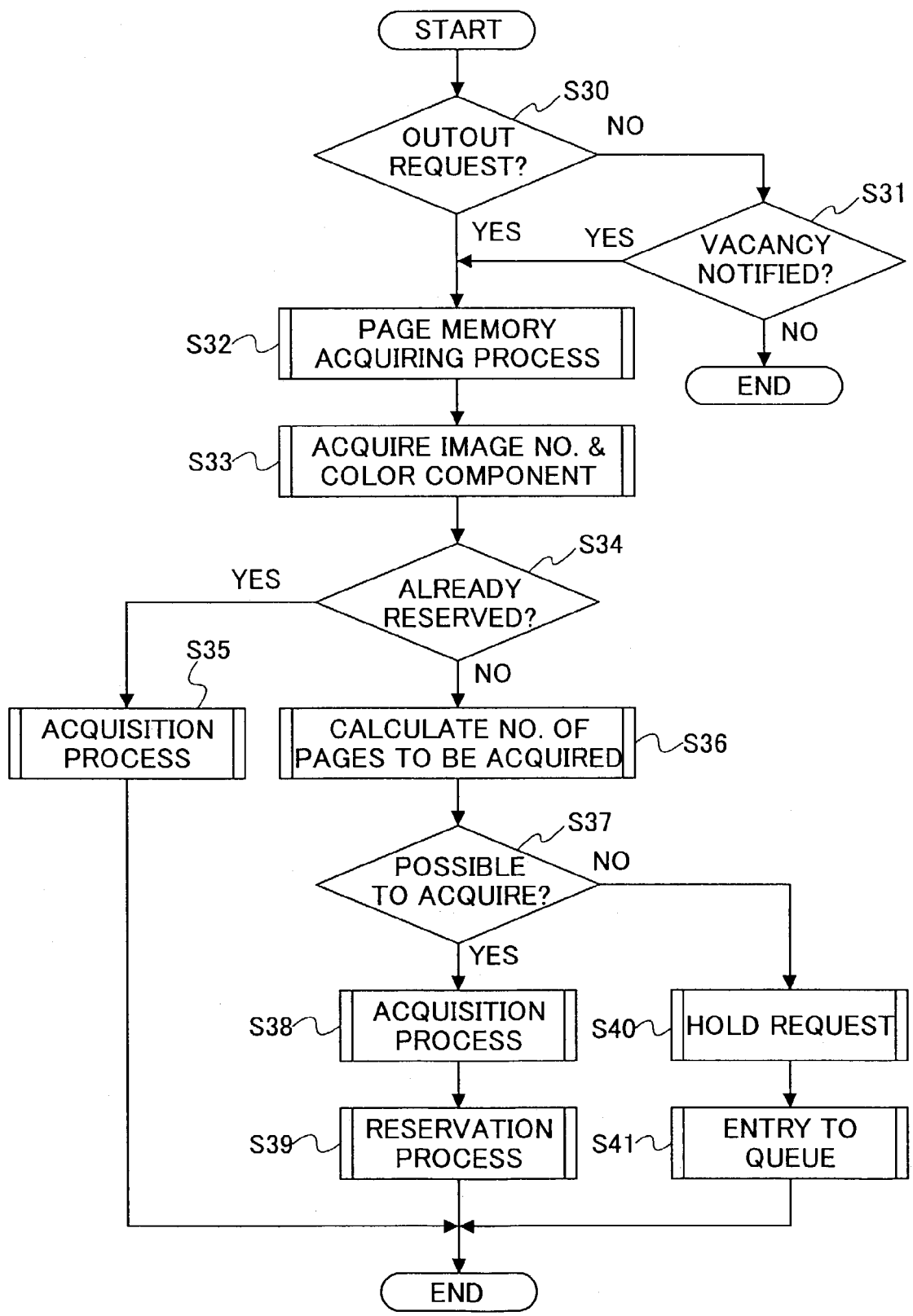
FIG. 10 is a flow chart for explaining a page memory acquiring process for output in a 4-drum color machine.
Figure 11:
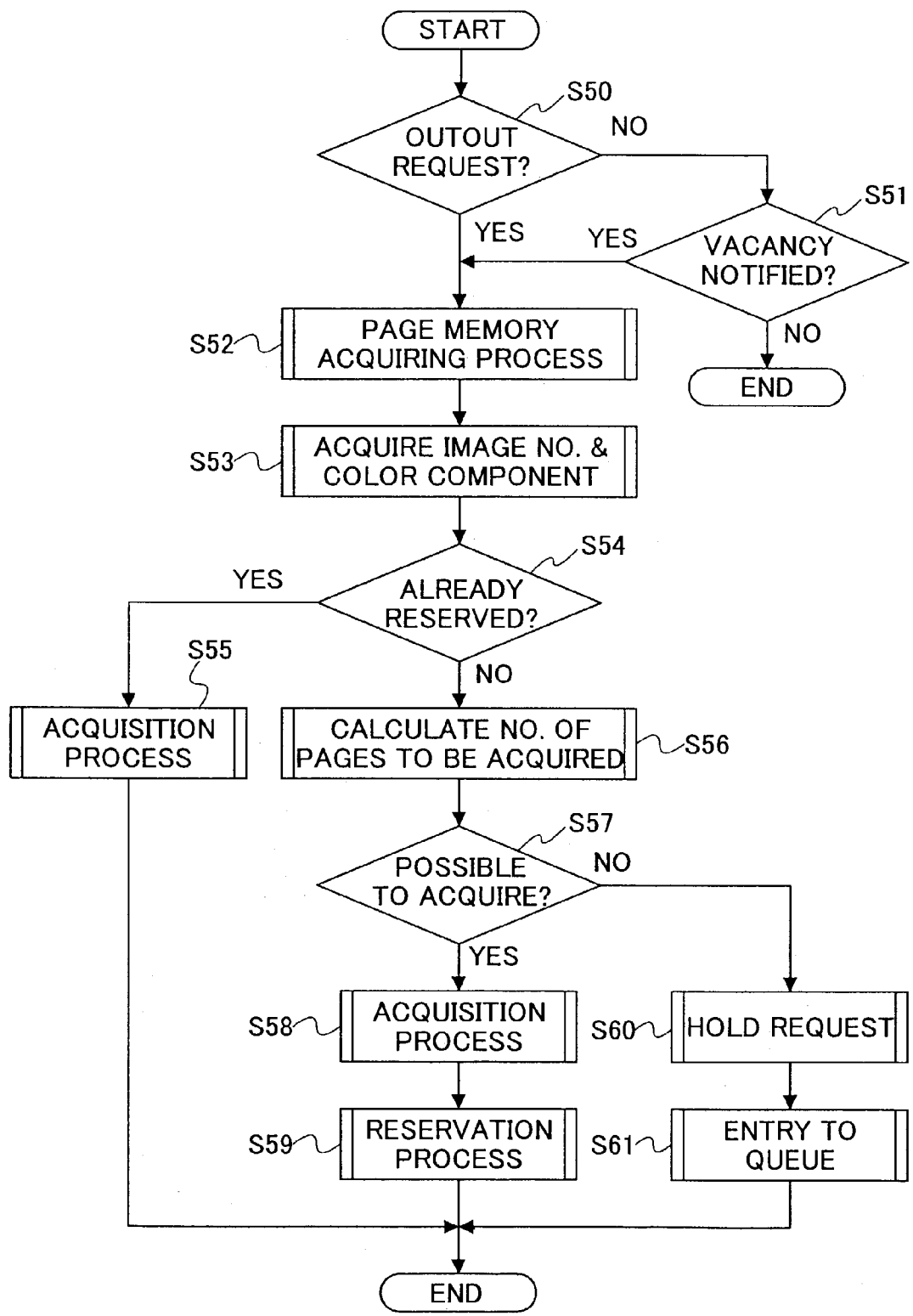
FIG. 11 is a flow chart for explaining a page memory acquiring process for output in a 1-drum color machine.

In this embodiment, a control is carried out to prevent the input/output wait state, as will be described with reference to FIGS. 8 through 11. FIG. 8 is a diagram for explaining an acquisition, reserved state and an acquired state of the page memory for input and output when the processes described hereunder are carried out. FIG. 9 is a flow chart for explaining a page memory acquiring process for input. FIG. 10 is a flow chart for explaining a page memory acquiring process for output in a 4-drum color machine. In addition, FIG. 11 is a flow chart for explaining a page memory acquiring process for output in a 1-drum color machine. These processes are carried out by programs executed by the CPU 68.

A description will be given of the page memory acquiring process for input, which is carried out by the CPU 68, by referring to FIG. 9. In FIG. 9, a step S10 decides whether or not an input request exists. If the decision result in the step S10 is YES, a step S12 carries out a page memory acquiring process for input. On the other hand, if the decision result in the step S10 is NO, a step S11 decides whether or not a vacancy of the page memory is notified. The process ends if the decision result in the step S11 is NO. If the decision result in the step S11 is YES, the process advances to the step S12 which carries out the page memory acquiring process for input.

After the carrying out the page memory acquiring process for input in the step S12, a step S13 acquires an image number and each color component for which the page memory is to be acquired for input. In the following description, it is assumed that a number of input requests corresponding to the number of color components are generated with respect to each image number.

Next, a step S14 decides whether or not the page memory is already reserved by the image number for which the input request is made to acquire the page memory. If the decision result in the step S14 is YES, a step S15 carries out an acquisition process to acquire a number of pages used for storing 1 color component in the page memory which is already reserved by the image number for which the input request is made to acquire the page memory, and the process ends.

On the other hand, if the decision result in the step S14 is NO, a step S16 calculates the number of pages of the page memory to be acquired by the page number calculating means. More particularly, the CPU 68 calculates the number of pages (page number) of the page memory to be acquired from a product of a number of color components used by the input image number and a number of pages (page number) of the page memory used by 1 color component.

A step S17 decides whether or not it is possible to acquire the number of pages of the page memory calculated by the page number calculating means. If vacant pages exist in the page memory and the decision result in the step S17 is YES, a step S18 carries out an acquisition process to acquire the number of pages of the page memory used for storing 1 color component of the image number for which the input request is made to acquire the page memory.

With regard to the other color components, a step S19 carries out a reservation process to reserve a number of pages of the page memory by the image number for which the input request is made to acquire the page memory, where the number of pages is a product of a number of color components for which the pages of the page memory are not yet acquired and a number of pages of the page memory used by 1 color component. The pages of the page memory reserved by the reservation process for these other color components are acquired by the acquisition process of the step S15 which is carried out when the input request therefor is generated and the decision result in the step S14 is NO. The process ends after the step S19.

If the number of pages of the page memory calculated by the page number calculating means cannot be acquired and the decision result in the step S17 is NO, a step S20 holds the execution of the input request. Then, a step S21 makes an entry of the input request into a page memory vacancy wait queue so that the CPU 68 will be notified when the present state of the page memory changes and vacant pages of the page memory become usable, and the process ends. When the CPU 68 is notified of such vacant pages of the page memory which are usable, the decision result in the step S11 described above becomes YES. When the decision result in the step S11 becomes YES, the CPU 68 again carries out the page memory acquiring process for input by the step S12 and the subsequent steps.

The acquisition, the reserved state and the acquired state of the page memory for input and output become as shown in FIG. 8 when the processes described above are carried out. In FIG. 8, the sequence of the input and output requests are shown/at the left portion, the acquisition, the reserved state and the acquired state of the page memory for input are shown at the central portion, and the acquired pages of the page memory are shown at the right portion. In FIG. 8, the same designations are used as in FIG. 7.

Next, a description will be given of the page memory acquiring process for output, which is carried out by the CPU 68, by referring to FIG. 10. FIG. 10 shows the page memory acquiring process for output for the case where the number of pages of the page memory acquired for output is a product of a number of color components used for output and a number of pages of the page memory used by 1 color component for output, that is, the page memory acquiring process of the 4-drum color machine.

The 4-drum color machine refers to an image forming apparatus which forms a color image by use of a plurality of image forming units of different colors arranged in an image forming sequence along a transport path of the recording paper. Each image forming unit transfers an image of a corresponding color when the recording paper passes a transfer position of the image forming unit. Various 4-drum color machines have been proposed and are thus known. Hence, illustration and detailed description on the structure and operation of the 4-drum color machine will be omitted in this specification.

In FIG. 10, a step S30 decides whether or not an output request exists. If the decision result in the step S30 is YES, a step S32 carries out a page memory acquiring process for output. On the other hand, if the decision result in the step S30 is NO, a step S31 decides whether or not a vacancy of the page memory is notified. The process ends if the decision result in the step S31 is NO. If the decision result in the step S31 is YES, the process advances to the step S32 which carries out the page memory acquiring process for output.

After the carrying out the page memory acquiring process for output in the step S32, a step S33 acquires an image number and each color component for which the page memory is to be acquired for output. In the following description, it is assumed that a number of output requests corresponding to the number of color components are generated with respect to each image number.

Next, a step S34 decides whether or not the page memory is already reserved by the image number for which the output request is made to acquire the page memory. If the decision result in the step S34 is YES, a step S35 carries out an acquisition process to acquire a number of pages used for storing 1 color component in the page memory which is already reserved by the image number for which the output request is made to acquire the page memory, and the process ends.

On the other hand, if the decision result in the step S34 is NO, a step S36 calculates the number of pages of the page memory to be acquired by the page number calculating means. More particularly, the CPU 68 calculates the number of pages of the page memory to be acquired from a product of a number of color components used by the output image number and a number of pages of the page memory used by 1 color component.

A step S37 decides whether or not it is possible to acquire the number of pages of the page memory calculated by the page number calculating means. If vacant pages exist in the page memory and the decision result in the step S37 is YES, a step S38 carries out an acquisition process to acquire the number of pages of the page memory used for storing 1 color component of the image number for which the output request is made to acquire the page memory.

With regard to the other color components, a step S39 carries out a reservation process to reserve a number of pages of the page memory by the image number for which the output request is made to acquire the page memory, where the number of pages is a product of a number of color components for which the pages of the page memory are not yet acquired and a number of pages of the page memory used by 1 color component. The process ends after the step S39. The pages of the page memory reserved by the reservation process for these other color components are acquired by the acquisition process of the step S35 which is carried out when the output request therefor is generated and the decision result in the step S34 is NO.

If the number of pages of the page memory calculated by the page number calculating means cannot be acquired and the decision result in the step S37 is NO, a step S40 holds the execution of the output request. Then, a step S41 makes an entry of the output request into a page memory vacancy wait queue so that the CPU 68 will be notified when the present state of the page memory changes and vacant pages of the page memory become usable, and the process ends.

When the CPU 68 is notified of such vacant pages of the page memory which are usable, the decision result in the step S31 described above becomes YES. When the decision result in the step S31 becomes YES, the CPU 68 again carries out the page memory acquiring process for output by the step S32 and the subsequent steps.

The acquisition, the reserved state and the acquired state of the page memory for input and output become as shown in FIG. 8 when the processes described above are carried out.

Next, a description will be given of the page memory acquiring process for output, which is carried out by the CPU 68, by referring to FIG. 11. FIG. 11 shows the page memory acquiring process for output for the case where the number of pages of the page memory acquired for output is two times the number of pages of the page memory used by 1 color component for output, that is, the page memory acquiring process of the 1-drum color machine such as that shown in FIG. 1.

In FIG. 11, steps S50 through S58, S60 and S61 are the same as the corresponding steps S30 through S38, S40 and S41 shown in FIG. 10, and a description thereof will be omitted. Unlike the step S39 shown in FIG. 10, a step S59 shown in FIG. 11 carries out a reservation process to reserve a number of pages of the page memory used by 1 color component by the image number for which the output request is made to acquire the page memory, and the process ends.

In the case of the 1-drum color machine, it is sufficient to acquire the number of pages of the page memory amounting to two times the number of pages of the page memory used by 1 color component, and it is unnecessary to acquire the pages of the page memory with respect to all of the color components of the image data to be output. By using two pages of the page memory in a toggle operation, it is possible to positively prepare the necessary number of pages of the page memory for output.

Figure 12:
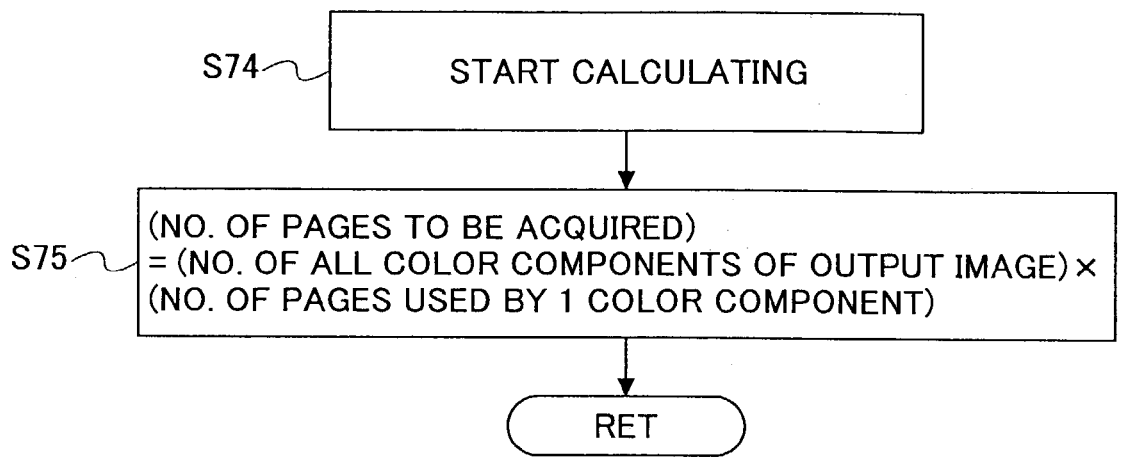
FIG. 12 is a flow chart for explaining a page number calculating process in the 4-drum color machine.

Next, a description will be given of a page number calculating process of the page number calculating means, by referring to FIG. 12. FIG. 12 is a flow chart for explaining the page number calculating process in the 4-drum color machine. When the page number calculating process of the step S36 shown in FIG. 10 is started in a step S74, a step S75 calculates the number of pages of the page memory to be acquired by the page number calculating means. More particularly, the page number calculating means calculates the number of pages of the page memory to be acquired from a product of a number of all color components used by the output image number and a number of pages of the page memory used by 1 color component. In the case of the 4-drum machine, the number of pages of the page memory used for the color component are successively released after use so that it is possible to use the released number of pages of the page memory for input or output.

Figure 13:
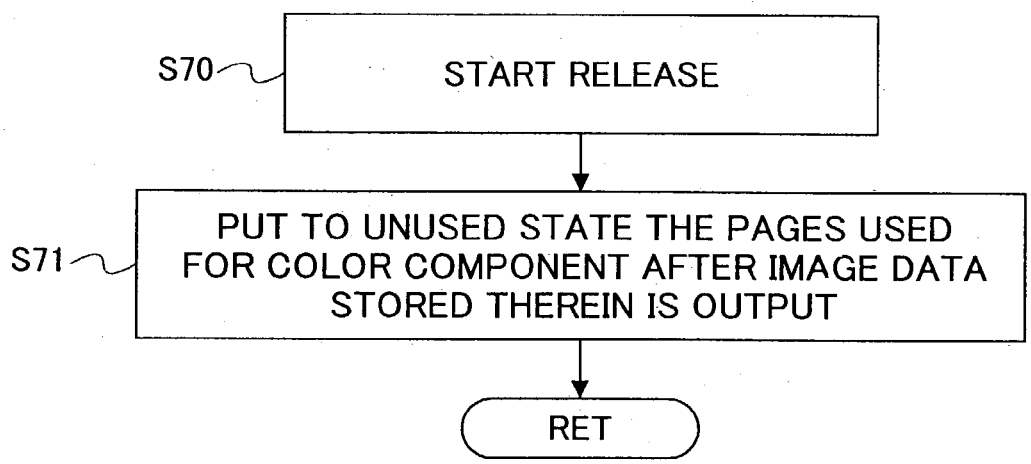
FIG. 13 is a flow chart for explaining a page memory release process after use of the page memory for output is completed in the 4-drum color machine.

Next, a description will be given of a page memory release process, by referring to FIG. 13. FIG. 13 is a flow chart for explaining a page memory release process after use of the page memory for output is completed in the 4-drum color machine. When the page memory release process of the CPU 68 is started in a step S70 shown in FIG. 13, a step S71 releases the number of pages of the page memory used for the color component after the image data stored therein is output, so as to put these number of pages of the page memory into an unused state.

Figure 14:
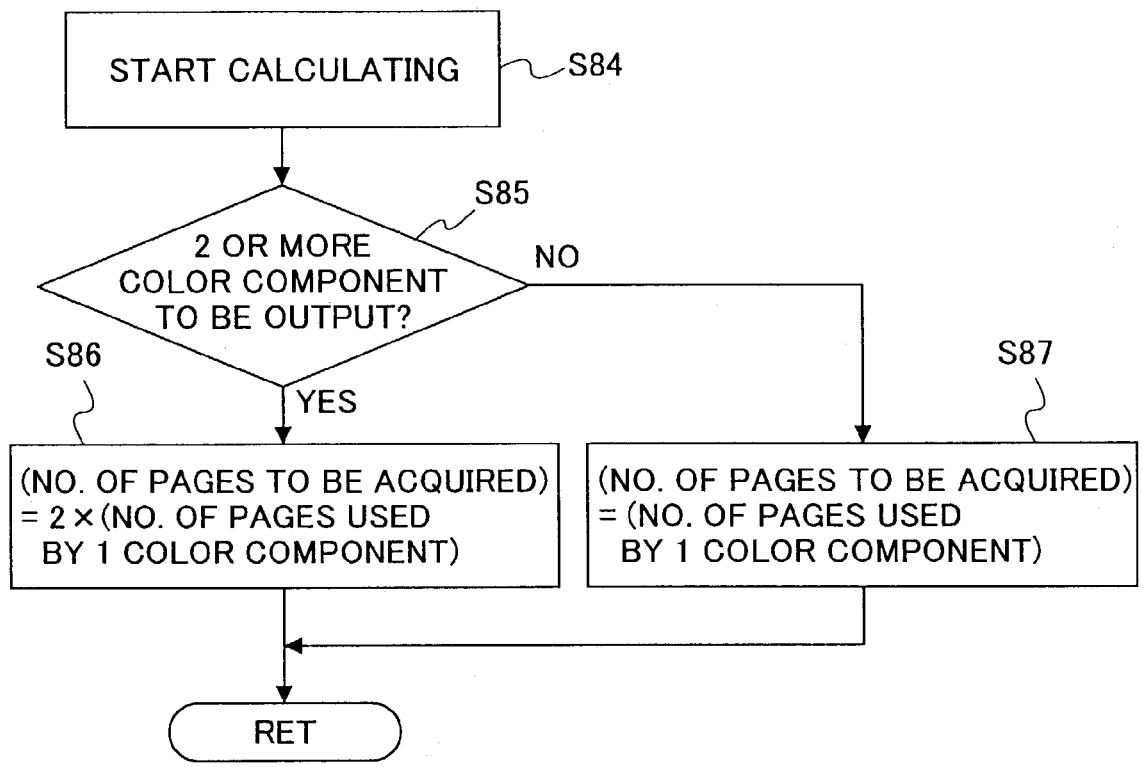
FIG. 14 is a flow chart for explaining a page number calculating process in the 1-drum color machine.

Next, a description will be given of a page number calculating process of the page number calculating means, by referring to FIG. 14. FIG. 14 is a flow chart for explaining the page number calculating process in the 1-drum color machine. When the page number calculating process of the step S56 shown in FIG. 11 is started in a step S84, a step S85 decides whether or not a number of color components to be output is 2 or less. If the decision result in the step S85 is YES, a step S86 calculates the number of pages of the page memory to be acquired by the page number calculating means. More particularly, in the step S86, the page number calculating means calculates the number of pages of the page memory to be acquired as 2 times a number of pages of the page memory used by 1 color component, so that 2 pages of the page memory can be used in a toggle operation. On the other hand, if the decision result in the step S85 is NO, a step S87 calculates the number of pages of the page memory to be acquired as the number of pages of the page memory used by 1 color component, because it is unnecessary to prepare for another color component in this case. In the case of the 1-drum machine, the number of pages of the page memory used for the color component are successively released after use so that it is possible to use the released number of pages of the page memory for input or output.

Figure 15:
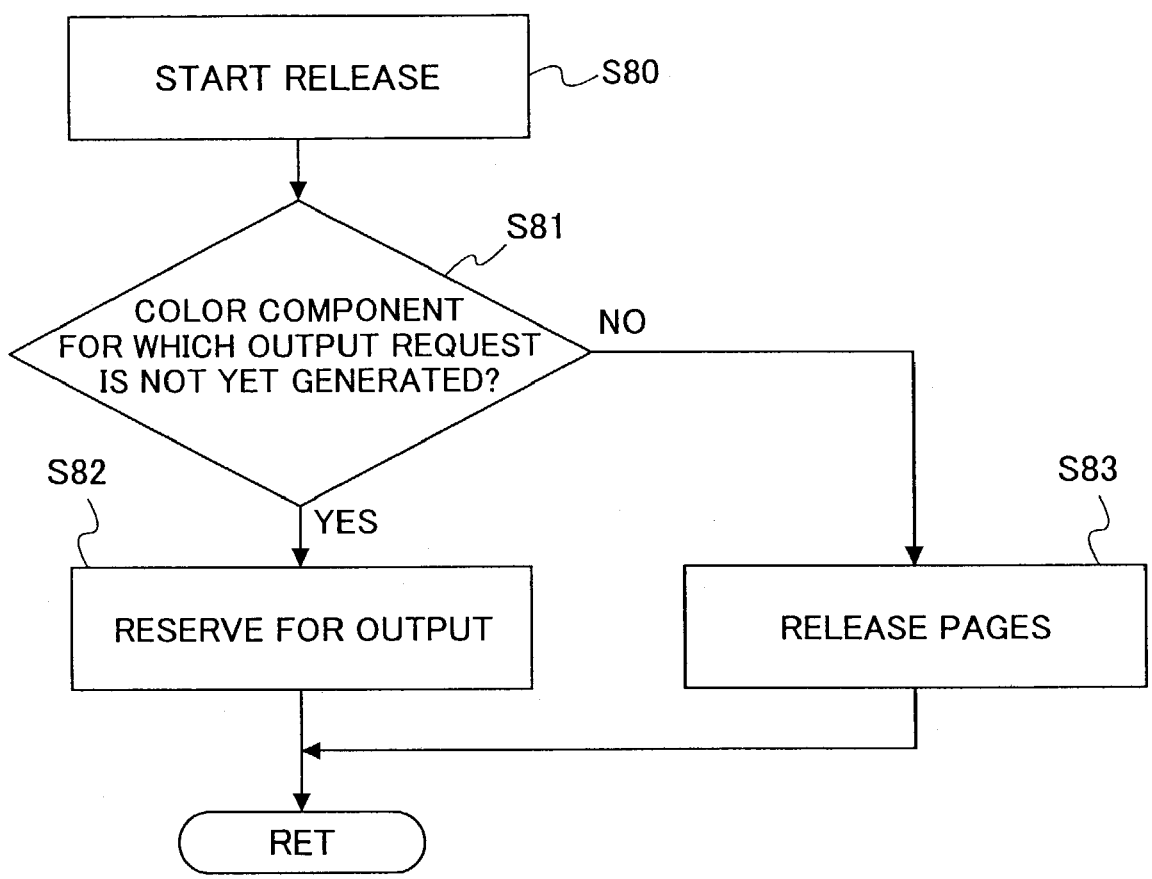
FIG. 15 is a flow chart for explaining a page memory release process after use of the page memory for output is completed in the 1-drum color machine.

Next, a description will be given of a page memory release process, by referring to FIG. 15. FIG. 15 is a flow chart for explaining a page memory release process after use of the page memory for output is completed in the 1-drum color machine. When the page memory release process of the CPU 68 is started in a step S80 shown in FIG. 15, a step S81 decides whether or not there exists a color component for which an output request is not yet generated at an image number for which the output of the image data is completed. This decision is made because, if the image data output is completed for a certain color component and the number of pages of the page memory used therefor is no longer necessary, but the image data output for another color component is not completed for the same image number and the output request therefor is not yet generated, it is necessary to make the image data output for still another color component for the same image number.

If the decision result in the step S81 is YES, a step S82 reserves for output the number of pages of the page memory used for the color component after the image data stored therein is output. In other words, the number of pages of the page memory used for the color component after the image data stored therein is output is not released but is reserved instead so that these number of pages of the page memory can be used continuously for the output of another color component for the same image number. As a result, it is possible to prevent the page memory from being acquired by another input or output request and to positively acquire the required number of pages of the page memory.

On the other hand, if the decision result in the step S81 is NO, a step S83 releases the number of pages of the page memory used for the color component after the image data stored therein is output, so as to put these number of pages of the page memory into an unused state. Hence, it becomes possible to use the released number of pages of the page memory for another input or output request.

Therefore, according to the first embodiment described heretofore, it is possible to prevent a situation where the required number of pages of the page memory cannot be acquired at the time of printing. In addition, it is possible to provide an optimum page memory management.

Next, a description will be given of a second embodiment of the image forming apparatus according to the present invention. This second embodiment of the image forming apparatus employs a second embodiment of the memory control apparatus according to the present invention, and a second embodiment of the memory control method according to the present invention. This second embodiment employs the same hardware structure as that of the first embodiment shown in FIGS. 1 through 6, and illustration and description of the hardware structure will be omitted.

First, a description will be given of the page memory acquiring process for a case where no backup mechanism is provided for the image data stored in the page memory.

Figure 16:
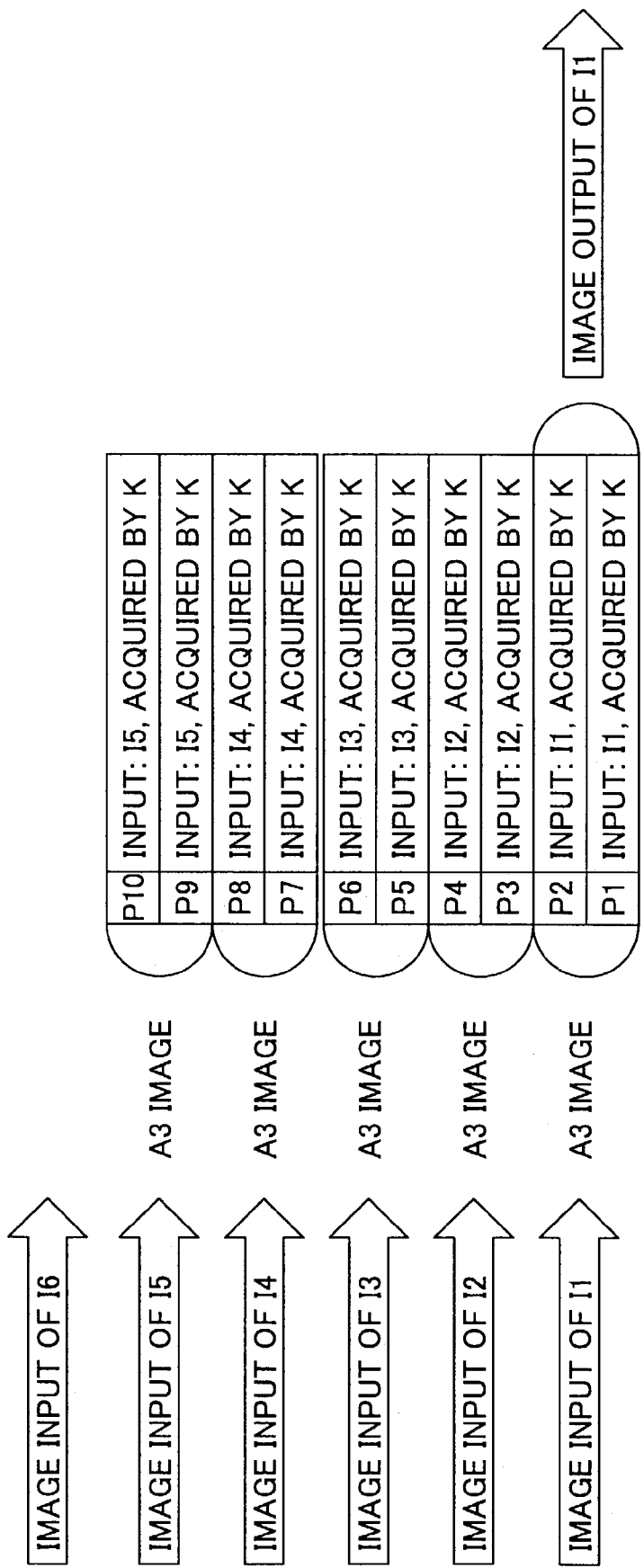
FIG. 16 is a diagram for explaining acquisition of the page memory in a second embodiment of the image forming apparatus according to the present invention when no backup mechanism is provided for the image data stored in the page memory.

FIG. 16 is a diagram for explaining acquisition of the page memory in this second embodiment of the image forming apparatus when no backup mechanism is provided for the image data stored in the page memory. The backup mechanism temporarily stores the contents of the page memory in the storage means such as the HDD. As described above, the page memory corresponds to the first storage unit 206, and the storage means corresponds to the second storage unit 207.

When the image forming apparatus has no second storage unit 7 and thus has no backup mechanism for the input image data, the input image data must be stored in the first storage unit 6, that is, the page memory, until the output of the stored image data is completed. Hence, the page memory can be used to store the input image data of the next document or the like, only after the printing of the stored image data is completed.

FIG. 16 shows a case where the black image data K of document images having A3-size and image numbers I1 through I5 are input and stored in the page memory, and the page memory has 10 pages each having a size corresponding to A4-size. Because the document size is A3, 2 pages of the page memory, each having a size corresponding to A4-size, are used to store the image data of the document images. The image data of each document image can successively be stored in the page memory if 2 pages of the page memory can be acquired therefor. In the state shown in FIG. 16, the black image data K of the image numbers I1 through I5 are stored in the page numbers P1 through P10 of the page memory, and the black image data K of the image number I1 is output to be printed. In addition, since there are no vacant pages in the page memory, the storage of the black image data K of an image number I6 is in the input/output wait state (or hold state).

Figure 17:
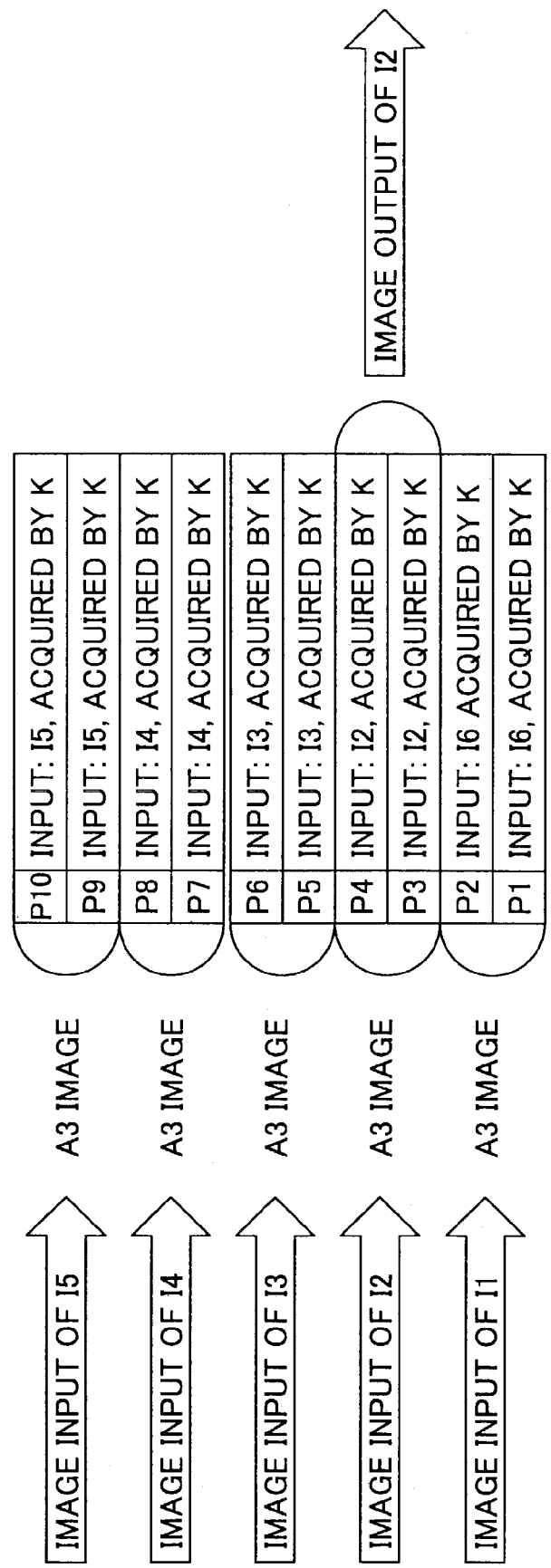
FIG. 17 is a diagram for explaining an input of a document image data stored in the page memory after the page memory is released in FIG. 16.

FIG. 17 is a diagram for explaining an input of a document image data stored in the page memory after the page memory is released in FIG. 16. FIG. 17 shows a state where the printing of the black image data K stored in the page numbers P1 and P2 of the page memory is completed and the page numbers P1 and P2 are released, and the black image data K of the image number I6 is stored in the page numbers P1 and P2 of the page memory. In other words, the black image data K of the image number I6 is in the input/output wait state until 2 pages of the page memory become vacant, and is stored in the page memory when 2 pages are released and become vacant. In the state shown in FIG. 17, since there are no vacant pages in the page memory, the storage of the black image data K of an image number I7 is in the input/output wait state (or hold state).

Suppose that a print job is to print a date in red on the black-and-white document which is described by the image data of the color component K (that is, the black image data K). In this particular case, a number of pages of the page memory are acquired for the black component K in response to the notified input image data size and color component K. In addition, the black image data K to be output and printed is stored in the acquired pages of the page memory. However, the page memory does not include a page exclusively for storing the date data, and thus, it is necessary to acquire one or more pages of the page memory in order to store or develop the date data in the page memory.

If the page memory has a large number of pages, no problem will occur in storing the date data because the date data can be stored in the page memory in addition to the black image data K to be printed. However, when the page memory only has a small number of pages, the page memory becomes full as shown in FIG. 16, and the required number of pages of the page memory for developing the date data for printing cannot be acquired in such a case. As a result, the required page memory resource cannot be acquired, thereby making it impossible to execute the print job. Of course, if the storage means (second memory unit 207) is provided in addition to the page memory (first memory unit 206), the black image data K stored in the page memory can be saved in the storage means so as to provide vacant pages for the date data in the page memory.

Next, a description will be given of the method of preventing the above described inconveniences when the storage means (second storage unit 207) is not provided, in a case where the number of color components used for the output is larger than the number of color components used for the input.

The number of color components used for the output may be larger than the number of color components used for the input during a print mode in which the image data and additional information are printed on the recording paper. The additional information includes fixed stamp, user stamp, date, page and the like. The fixed stamp includes fixed information such as "TOP SECRET" and "COPY PROHIBITED" which are to be printed. The user stamp includes information which is registered by the user and is to be printed. The date includes information such as "2002/01/02" which is to be printed. The page includes information such as "P. 1, P. 2, . . . " and "⅕, ⅖, . . . " which are to be printed. The additional information may be input by the user or generated by the CPU 68 and stored in the ROM 69 shown in FIG. 5, for example.

If the color component of the additional information is the same as the color component of the image data to be printed, the additional information and the image data of the same color component may be synthesized into one image data by the CPU 68 when being input to the page memory. Such a synthesizing process itself is known, and a detailed description thereof will be omitted in this specification.

For example, suppose that the date data is to be printed in red using magenta data M and yellow data Y, with respect to the image data K which is to be printed. In this case, an image output color component notifying means (or section) is provided to notify the CPU 68 of the color components to be output and printed when inputting the image data in the page memory. Hence, the CPU 68 can know in advance the color components to be used for the printing when inputting the image data to the page memory. For this reason, it is possible to permit a state where the required number of pages of the page memory can be acquired for the number of color components of the image data to be input and the number of color components of the additional information to be output from the page memory.

Figure 18:
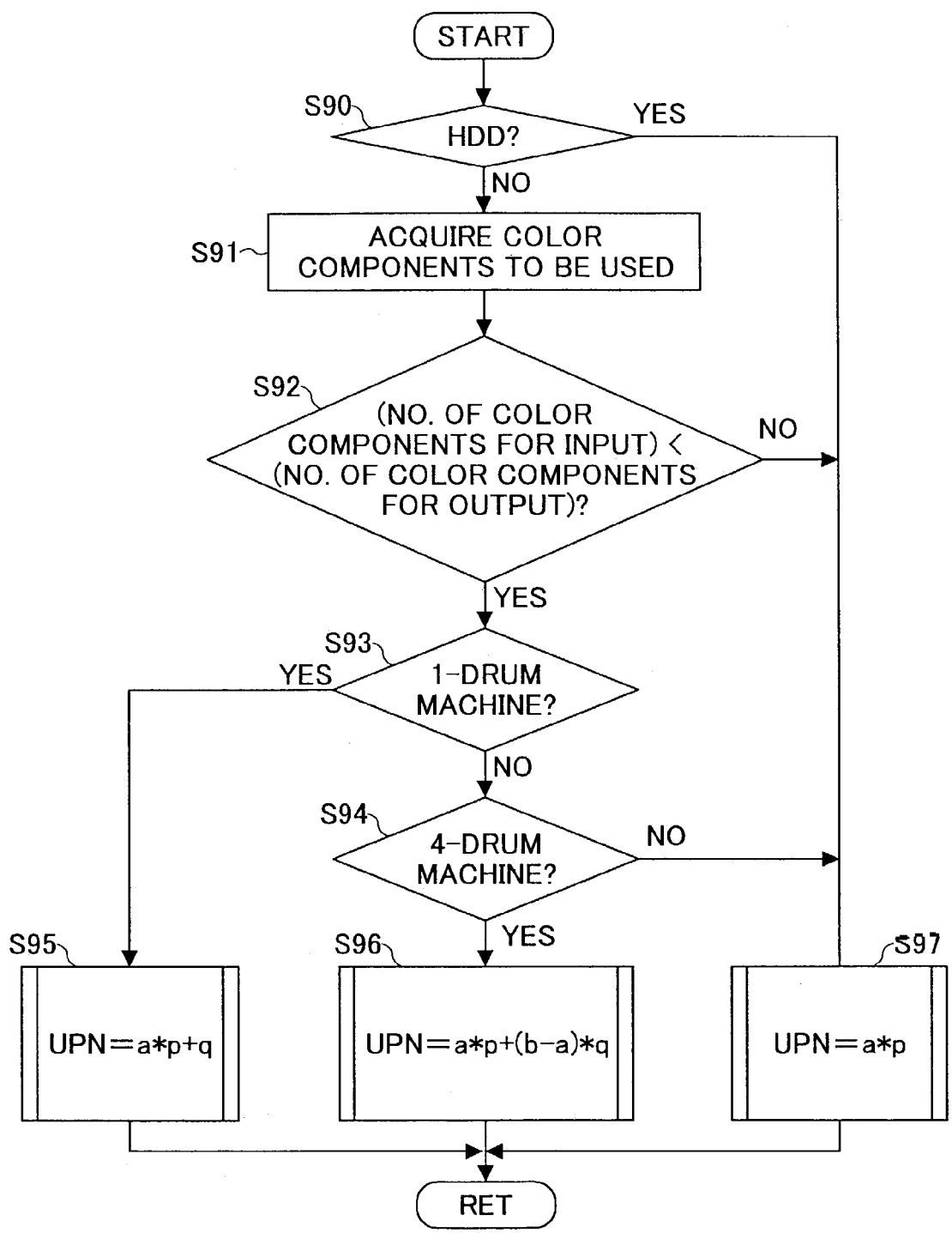
FIG. 18 is a flow chart for explaining a using page number calculating process of a page number calculating means in the second embodiment of the image forming apparatus.

A description will be given of the process of the page number calculating means of this second embodiment of the image forming apparatus, by referring to FIG. 18. FIG. 18 is a flow chart for explaining a using page number calculating process of the page number calculating means in this second embodiment, corresponding to the process carried out by the step S16 shown in FIG. 9. Steps S95 through S97 which obtain the number of pages of the page memory for input will be described later in more detail after generally describing the entire using page number calculating process shown in FIG. 18.

In the using page number calculating process shown in FIG. 18, the process branches for the 1-drum machine and the 4-drum machine because the page memory is managed differently between the 1-drum machine and the 4-drum machine. In the case of the 4-drum machine, it is necessary to simultaneously prepare a number of pages of the page memory for storing the image data of all of the color components to be printed. But in the case of the 1-drum machine, the image formation is carried out for each color, and thus, it is unnecessary to simultaneously prepare the number of pages of the page memory for storing the image data of all of the color components to be printed.

The page number calculating means, that is, the CPU 68, carries out the using page number calculating process shown in FIG. 18. In FIG. 18, a step S90 decides whether or not the second storage unit 207 such as the HDD is provided in the image forming apparatus. If the decision result in the step S90 is YES, the step S97 calculates the using page number according to a third calculation method, and the process returns to the step S17 shown in FIG. 9. On the other hand, if the decision result in the step S90 is NO, a step S91 acquires the color components to be used when outputting the image data.

A step S92 decides whether or not the number of color components used for the input is smaller than the number of color components used for the output. If the decision result in the step S92 is NO, the step S97 calculates the using page number. On the other hand, if the decision result in the step S92 is YES, a step S93 decides whether or not the image forming apparatus is a 1-drum machine.

If the decision result in the step S93 is YES, the step S95 calculates the using page number according to a first calculation method, and the process returns to the step S17 shown in FIG. 9. On the other hand, if the decision result in the step S93 is NO, a step S94 decides whether or not the image forming apparatus is a 4-drum machine. If the decision result in the step S94 is NO, the step S97 calculates the using page number. If the decision result in the step S94 is YES, the step S96 calculates the using page number according to a second calculation method, and the process returns to the step S17 shown in FIG. 9.

The calculation method used to calculate the using page number differs between the 1-drum machine and the 4-drum machine, as described above. This is because, the image formation is carried out one color at a time in the case of the 1-drum machine, but the image formation is carried out for all of the 4 colors of the image in the case of the 4-drum machine. Hence, in the case of the 1-drum machine, it is sufficient to prepare a number of pages of the page memory for storing the image data of the image which is presently being printed and the image data of the image which is to be printed next, and these pages can be used for storing the image data of the subsequent images to be printed. But in the case of the 4-drum machine, it is necessary to prepare a number of pages of the page memory for storing the image data of all of the 4 colors of the image to be printed.

A more detailed description will now be given of the steps S95 through S97 which respectively employ the first, second and third calculation methods to calculate the using page number.

The step S95 is carried out in the case of the 1-drum machine, and the first calculation method uses the following formula (1) to calculate a using page number UPN, where a denotes a number of all color components of the image described by the input image data, p denotes a number of pages of the page memory used by the image data of 1 color component having the image size of the image described by the input image data, q denotes a number of pages of the page memory used by the additional information such as the date, and * denotes an operator indicating multiplication.

$$UPN = a*p + q \qquad (1)$$

For example, a is the number of color components in the input image data of the document (image) read by the scanner section 1, and a=1 if the printing is to be made in black only.

In this embodiment, 1 page of the page memory is allocated with respect to the image data having the A4-size. Hence, if the input image data has the A3-size, 2 pages of the page memory are required to store the input image data for 1 color component. Hence, p=1 if the input image data has the A4-size, and p=2 if the input image data has the A3-size.

For example, if the additional information is the date which is to be printed in black only with A4-size, q=1. Further, q=1 also if the date is to be printed in 2 colors black and cyan with A4-size.

The step S95 is carried out if the decision result in the step S92 is YES and the decision result in the step S93 is YES. Hence, if the input image data is to be printed in 2 color components black (K) and magenta (M), and the additional information is to be printed in at least one of color components cyan (C) and yellow (Y) which are different from the 2 color components black (K) and magenta (M), for example, p=1 regardless of whether the additional information is printed in cyan (C) only, yellow (Y) only or, both cyan (C) and yellow (Y). Hence, when printing an A4-size image, a=2, p=1 and q=1, and the UPN=3.

The step S96 is carried out in the case of the 1-drum machine, and the second calculation method uses the following formula (2) to calculate the using page number UPN, where b denotes a total number of color components of the image data to be finally printed.

$$UPN = a*p + (b-a)*q \qquad (2)$$

If the input image data is to be printed in 2 color components black (K) and magenta (M), the additional information is to be printed in color components cyan (C) and yellow (Y), and the A4-size image is to be printed, for example, a=2, p=1, q=1 and b=2+2=4, and UPN=2*1+(4−2)*1=4.

The step S97 is carried out if the decision result in one of the steps S90, S92 and S94 is NO, and the third calculation method uses the following formula (3) to calculate the using page number UPN. The step S97 is carried out when no second storage unit 207 such as the HDD is provided in the image forming apparatus or, the number of color components used for the input is larger than or equal to the number of color components used for the output, and thus, there is no need to take into consideration the number of color components used for the output when calculating the using page number UPN in this case.

$$UPN = a*p \qquad (3)$$

In this second embodiment, when an image B is input while outputting an image A, q=p if the images A and B have the same size. However, if the images A and B have mutually different sizes, the required number of pages of the page memory for output may not be obtainable in some cases when q=p. Such a situation occurs in a case where the printing is made in black (K) for the images having the document sizes input in the following sequence, for example, where B&W denotes a black-and-white image input, and I1 through I5 denote image numbers.

A3 B&W (I1: P1 & P2 of page memory used)
A3 B&W (I2: P3 & P4 of page memory used)
A3 B&W (I3: P5 & P6 of page memory used)
A3 B&W (I4: P7 & P8 of page memory used)

When outputting the A3-size black-and-white image input B&W having the image number I1, the image data is output from the pages P1 and P2 of the page memory. At the same time, it is possible to store an A3-size black-and-white image input B&W having the image number I5 into pages P9 and P10 of the page memory, as follows.

A3 B&W (I5: P9 & P10 of page memory used)

However, at the same time, an A4-size black-and-white image input B&W having the image number I5 may be requested instead of the A3-size black-and-white image input B&W, as follows.

A4 B&W (I5: P9 of page memory used)

Figure 19:
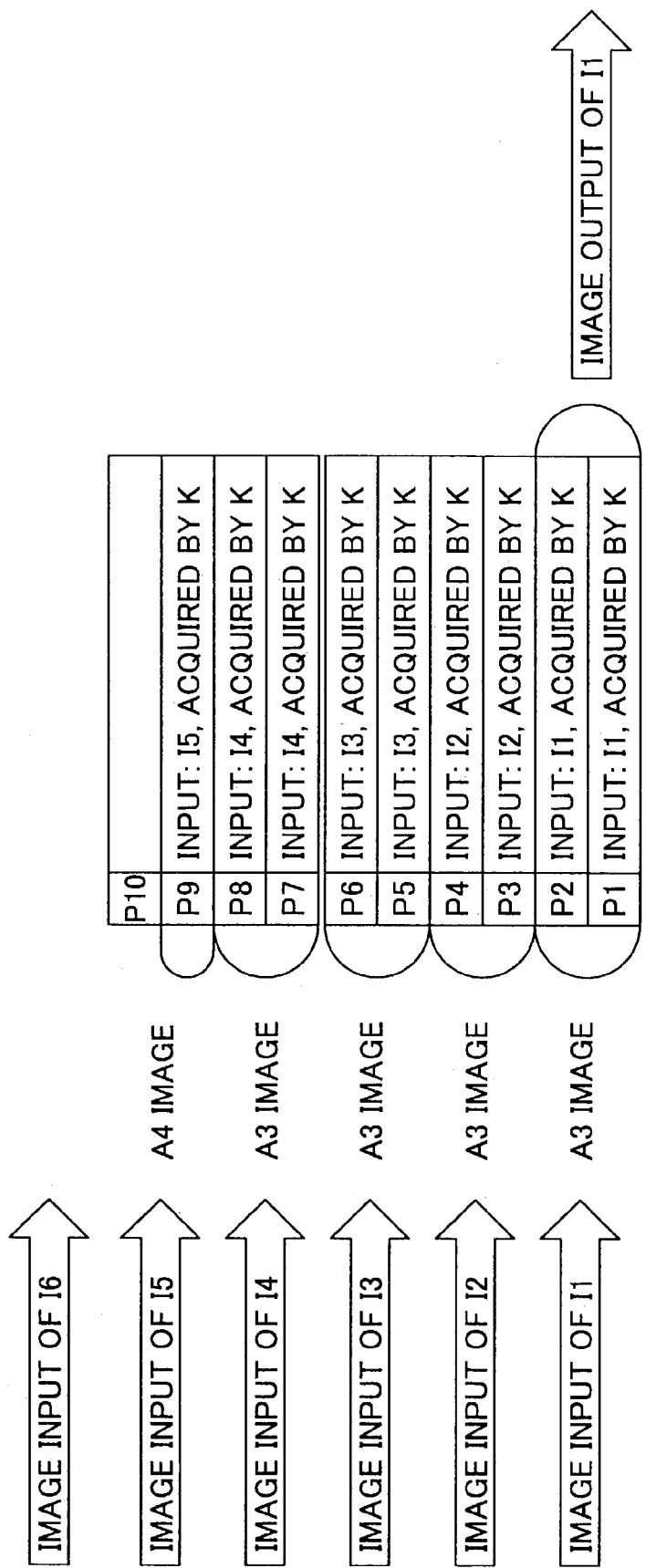
FIG. 19 is a diagram for explaining an acquired state of the page memory when storing image data of images having different sizes.

When the A4-size black-and-white image input B&W having the image number I5 is requested in the state where the pages P9 and P10 of the page memory are vacant, the request is permitted as shown in FIG. 19 because 1 page of the page memory can be allocated for the input and 1 page of the page memory can be allocated for the output. FIG. 19 is a diagram for explaining an acquired state of the page memory when storing image data of images having different sizes. But when the A3-size black-and-white image input B&W having the image number I2 is output from the page memory, there is only 1 vacant page, that is, only page P10 of the page memory is vacant, and it becomes impossible to permit input of another black-and-white image input B&W regardless of the image size.

Accordingly, this second embodiment sets q to one of the following.

a) q=[number of pages of the page memory used to input an A3-size image of 1 color component (2 pages in the case described above)]
b) q=[number of pages of the page memory used to input an image of 1 color component having a maximum image size]

By setting q in the above described manner, it is possible to prevent a situation where the required number of pages of the page memory cannot be acquired at the time of printing, even if the image forming apparatus is not provided with the second storage unit 207 such as the HDD and images of different sizes are input to the page memory.

Therefore, even when the image forming apparatus is not provided with the second storage unit 207 such as the HDD and the number of color components used for the input is smaller than the number of color components used for the output, it is possible to prevent a situation where the required number of pages of the page memory cannot be acquired at the time of printing. In addition, it is possible to provide an optimum page memory management for each of the 1-drum and 4-drum machines.

According to the first and second embodiments described heretofore, it is thus possible to efficiently manage the page memory so as to be able to cope with processing color images.

As described above, it is desirable to store the image data in the continuous page memory, because it would otherwise become necessary to generate and hold management information for relating discontinuous pages of the page memory. But still, if the pages of the page memory used for storing the image data are discontinuous, a complex calculation becomes necessary to calculate the required addresses of the discontinuous pages of the page memory when editing the image data, such as when synthesizing the additional information such as the date.

Accordingly, it is desirable to store the image data in continuous pages of the page memory. However, in some situations, the page memory may have a sufficient number of vacant pages required to store a target image data, but if the vacant pages are discontinuous, the input request must wait. Hence, it would be useful if the discontinuous vacant pages of the page memory can be efficiently utilized for storing the target image data in response to the input request when possible.

FIG. 20 is a diagram for explaining a page memory acquisition which does not take grouping of the pages into consideration. In FIG. 20 and FIG. 21 which will be described later, it is assumed for the sake of convenience that the page memory has 10 pages, and each page of the page memory has a memory capacity capable of storing image data having A4-size.

FIG. 20 shows a case where the image data of color components magenta (M), cyan (C), yellow (Y) and black (K) having A3-size are input to the page memory. In this case, 2 pages of the page memory are required to store the A3-size image data for each color component. In FIG. 20, pages P2 and P3 of the page memory are acquired for the image data of the color component M having the image number I2, pages P5 and P6 of the page memory are acquired for the image data of the color component C having the image number I2, and pages P8 and P9 of the page memory are acquired for the image data of the color component Y having the image number I2. If an attempt is made to acquire the page memory for the image data of the color component K having the image number I2 in this state, although pages P1, P4, P7 and P10 of the page memory are vacant, these pages are discontinuous, and thus it is impossible to acquire the required 2 continuous (consecutive) pages of the page memory for the image data of the color component K. As a result, the input request to input the image data of the color component K having the image number I2 must wait. In the case shown in FIG. 20, the input request must wait until the pages P2 and P3 of the page memory are released, so that the image data of the color component K and having the image number I2 can be input to consecutive pages P1 and P2 of the page memory as shown.

Hence, the vacant pages of the page memory are not efficiently utilized, and the input request must wait even when even when a sufficient number of vacant pages exist in the page memory if the vacant pages are discontinuous.

FIG. 21 is a diagram for explaining another page memory acquisition which does not take grouping of the pages into consideration.

FIG. 21 shows a case where an output request is made to output an A3-size color image data from the page memory while inputting another A3-size color image data to the page memory. In FIG. 20, pages P2 and P3 of the page memory store the image data of the color component M having the image number I2, pages P5 and P6 of the page memory store the image data of the color component C having the image number I2, pages P7 and P8 of the page memory store the image data of the color component Y having the image number I2, and pages P9 and P10 of the page memory store the image data of the color component K having the image number I2. In this state, an output request is made to output the image data of the color component M having the image number I1, and an output request is thereafter made to output the image data of the color component C having the image number I1. But in this case, the output request must wait until 2 consecutive pages of the page memory become vacant, even though the pages P1 and P4 of the page memory are vacant. In this case, the output request must wait until the pages P2 and P3 of the page memory are released, so that pages P1 and P2 of the page memory may be acquired for the image data of the color component M having the image number I1, and pages P3 and P4 of the page memory may be acquired for the image data of the color component C having the image number I1.

Next, a description will be given of a third embodiment of the image forming apparatus according to the present invention. This third embodiment of the image forming apparatus employs a third embodiment of the memory control apparatus according to the present invention, and a third embodiment of the memory control method according to the present invention. This third embodiment employs the same hardware structure as that of the first embodiment shown in FIGS. 1 through 6, and illustration and description of the hardware structure will be omitted.

Figure 22:
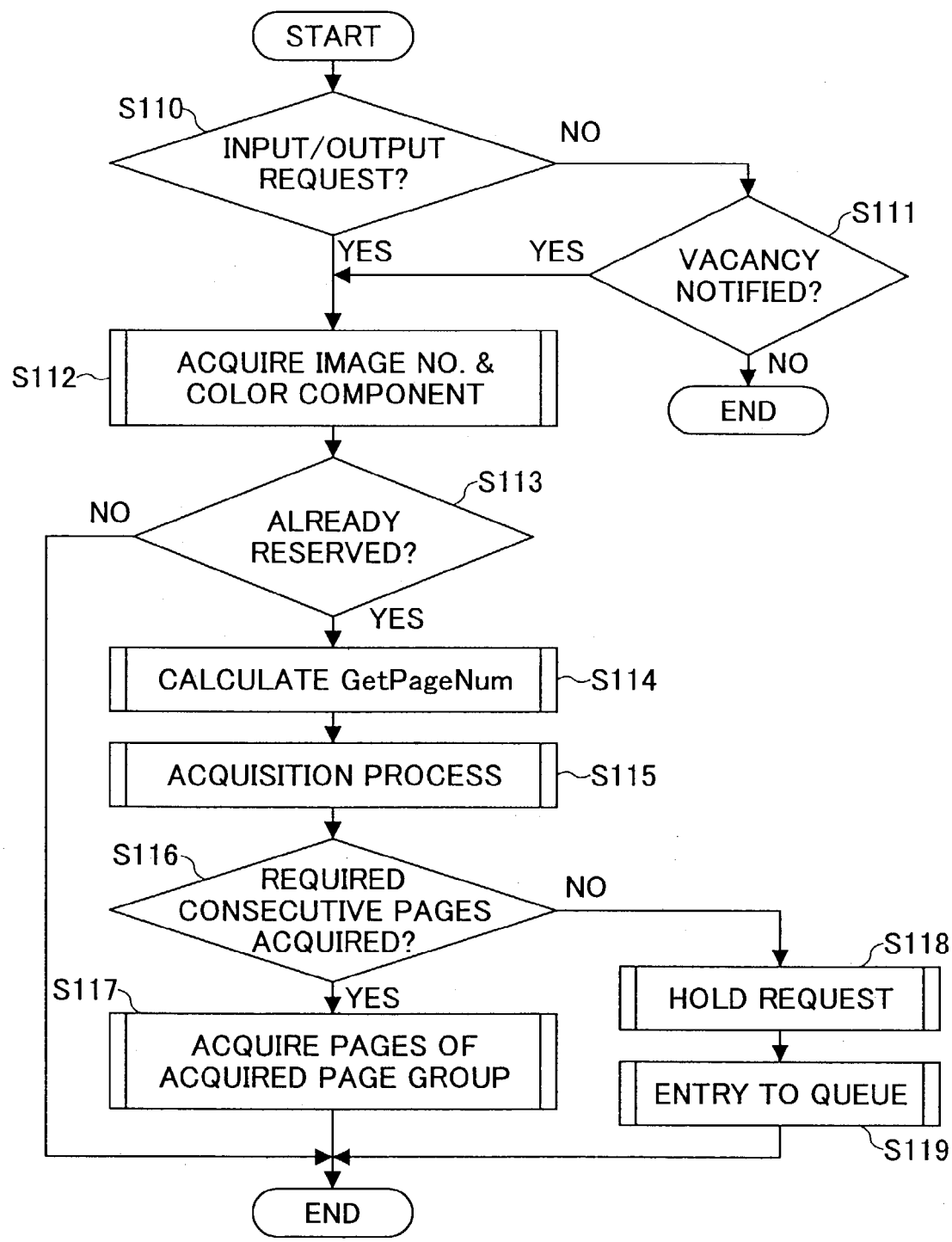
FIG. 22 is a flow chart for explaining a page memory acquiring process of a third embodiment of the image forming apparatus according to the present invention.
Figure 23:
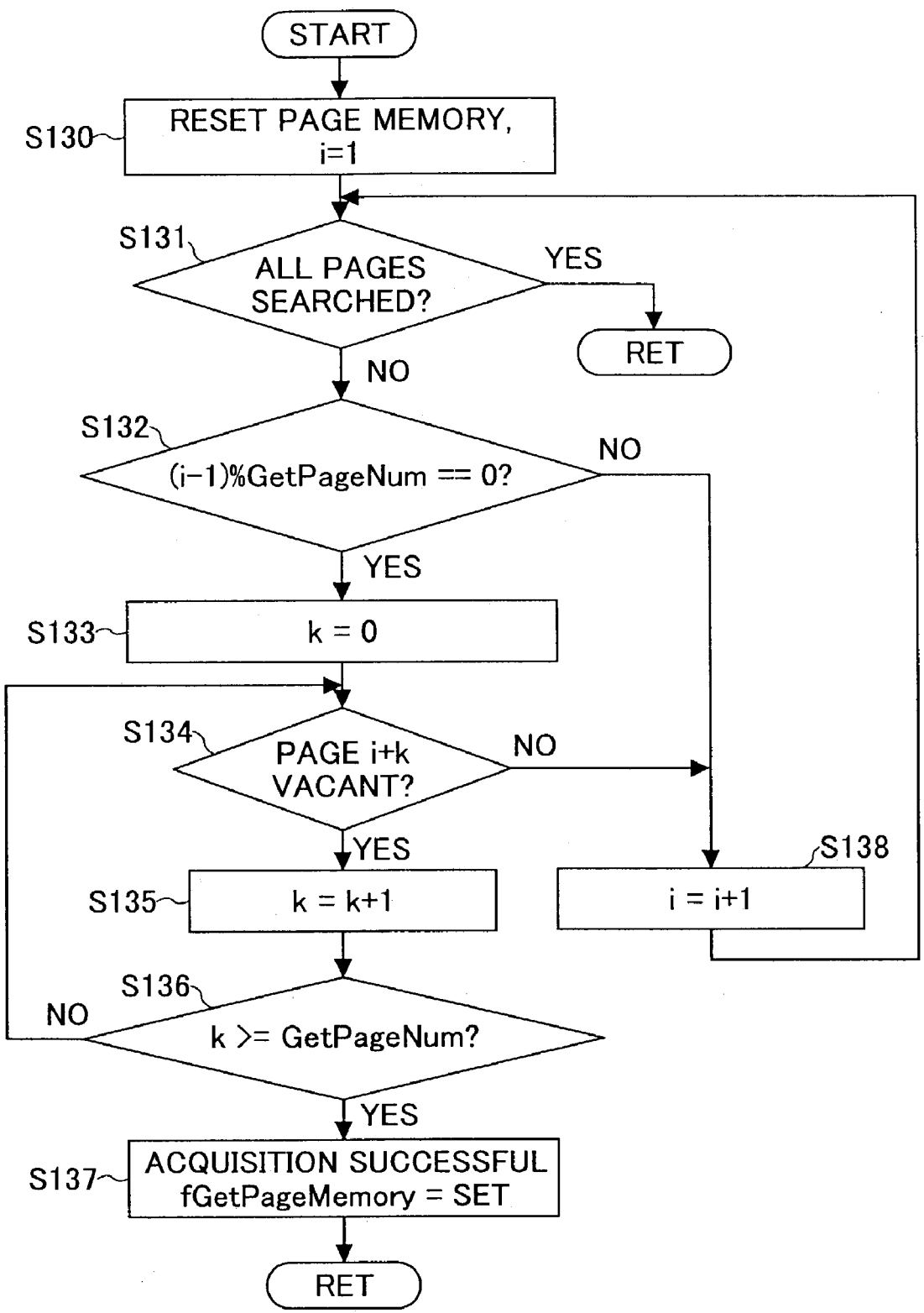
FIG. 23 is a flow chart for explaining a portion of the page memory acquiring process shown in FIG. 22 in more detail.

FIG. 22 is a flow chart for explaining a page memory acquiring process of the third embodiment of the image forming apparatus. FIG. 23 is a flow chart for explaining a portion of the page memory acquiring process shown in FIG. 22, that is, step S115, in more detail. The processes shown in FIGS. 22 and 23 are carried out by the CPU 68 shown in FIG. 5. This third embodiment acquires the page memory by taking into consideration a grouping of the pages of the page memory.

In FIG. 22, a step S110 decides whether or not an input request or an output request (hereinafter simply referred to as an input/output request) of the image data is made with respect to the page memory. If the decision result in the step S110 is NO, a step S111 decides whether or not consecutive pages of the page memory are vacant. The process ends if the decision result in the step S111 is NO. On the other hand, if the decision result in the step S110 or S111 is YES, the process advances to a step S112.

The step S112 acquires the image number and the color component of the image data for which the input/output request is made. It is assumed for the sake of convenience that a number of input/output requests corresponding to the number of color components is generated with respect to the image data having the same image number. A step S113 decides whether or not a number of pages of the page memory is already acquired by the image data having the image number requested by the input/output request, and the process ends if the decision result in the step S113 is YES.

If the decision result in the step S113 is NO, a step S114 calculates a number of pages of the page memory to be acquired by the memory controller 64, that is, GetPageNnm. More particularly, the number of pages of the page memory to be acquired (GetPageNnm) is calculated by dividing the size of the input/output image data by the size of 1 page of the page memory. If a quotient obtained by this division includes a remainder (fraction), the quotient is rounded up to a nearest integer.

A step S115 carries out a process shown in FIG. 23 by taking into account the grouping of the pages of the page memory.

A description will be given of the grouping of the pages of the page memory. In a case where the page memory has 10 pages P1 to P10, and the number of pages calculated in the step S114 is GetPageNnm=2, the CPU 68 groups the pages of the page memory into 5 page groups P1-P2, P3-P4, P5-P6, P7-P8 and P9-P10 respectively made up of consecutive pages. In other words, the pages of the page memory are consecutive or continuous within each page group. When acquiring a number of pages of the page memory required by the image data for which the input/output request is made, the CPU 68 searches the vacant page groups of the page memory.

The general rule for grouping the pages of the page memory is as follows. That is, if the number of pages of the page memory calculated in the step S114 is GetPageNnm=m, the CPU 68 sets each page group as being made up of m consecutive pages from a page having a page number 1 corresponding to the congruent using m as modulus. For example, assume that m=3. In this case, natural numbers starting from the congruent 1 using 3 as modulus, are 1, 4, 7, . . . . In other words, each page group starts from a page number which is one of natural numbers defined by an arithmetic sequence having an initial term 1 and a common difference 3, and includes 3 consecutive pages. By grouping the pages of the page memory in this manner, it is possible to obtain a maximum number of page groups for the page memory having a given number of pages.

Returning now to the description of FIG. 23, a step S130 resets the page memory and sets a page memory search counter i within the CPU 68 to i=1. The page memory search counter i counts the number of pages of the page memory searched. A step S131 decides whether or not all of the pages of the page memory is searched for vacancy, that is, whether or not i is greater than the number of pages of the page memory. If the decision result in the step S131 is YES, it is judged that the acquisition of consecutive pages of the page memory was unsuccessful, and the process returns to a step S116 shown in FIG. 22.

On the other hand, if the decision result in the step S131 is NO, a step S132 decides whether or not the page number i specified by the page memory search counter i is a starting page of a page group. More particularly, the step S132 decides whether or not (i−1)%GetPageNnm==0. The C-language (i−1)%GetPageNnm==0 indicates that a remainder is 0 when (i−1) is divided by GetPageNnm, that is, the congruent i using GetPageNnm as modulus is 1, where GetPageNnm denotes the number of pages of the page memory to be acquired and calculated in the step S114 shown in FIG. 22. As described above, GetPageNnm=2 if the image size of the image data is A3-size.

If the decision result in the step S132 is NO, a step S138 increments the page memory search counter i to i=i+1, so as to search for the next page of the page memory, and the process returns to the step S131

On the other hand, if the decision result in the step S132 is YES, a step S133 initializes a monitoring counter k within the CPU 68 to k=0. The monitoring counter k counts the number of consecutively acquired pages of the page memory. A step S134 decides whether or not page i+k of the page memory is vacant. If the decision result in the step S134 is NO, the process advances to the step S138.described above.

If the decision result in the step S134 is YES, a step S135 increments the monitoring counter k to k=k+1, and a step S136 decides whether or not consecutive pages of the page memory are acquired. More particularly, the step S136 decides whether or not k>=GetPageNnm. The process returns to the step S134 if the decision result in the step S136 is NO. On the other hand, if the decision result in the step S136 is YES, a step S137 judges that the acquisition of the consecutive pages of the page memory was successful, and the process returns to the step S116 shown in FIG. 22.

Returning now to the description of FIG. 22, the step S116 decides whether or not the required consecutive pages of the page memory are acquired. If the decision result in the step S116 is YES, a step S117 actually acquires each page of the page group acquired in response to the input/output request, and the process ends. On the other hand, if the decision result in the step S116 is NO, a step S118 holds the input/output request. After the step S118, a step S119 makes an entry of the input/output request into the page memory vacancy wait queue so that the CPU 68 will be notified when the present state of the page memory changes and vacant pages of the page memory become usable, and the process ends.

Therefore, according to this third embodiment, it is possible to further improve the utilization efficiency of the page memory, because the acquisition of the pages of the page memory is made in units of page groups, thereby facilitating the page memory management and avoiding random or scattered use of the pages of the page memory.

Next, a description will be given of a fourth embodiment of the image forming apparatus according to the present invention. This fourth embodiment of the image forming apparatus employs a fourth embodiment of the memory control apparatus according to the present invention, and a fourth embodiment of the memory control method according to the present invention. This fourth embodiment employs the same hardware structure as that of the first embodiment shown in FIGS. 1 through 6, and illustration and description of the hardware structure will be omitted.

Figure 24:
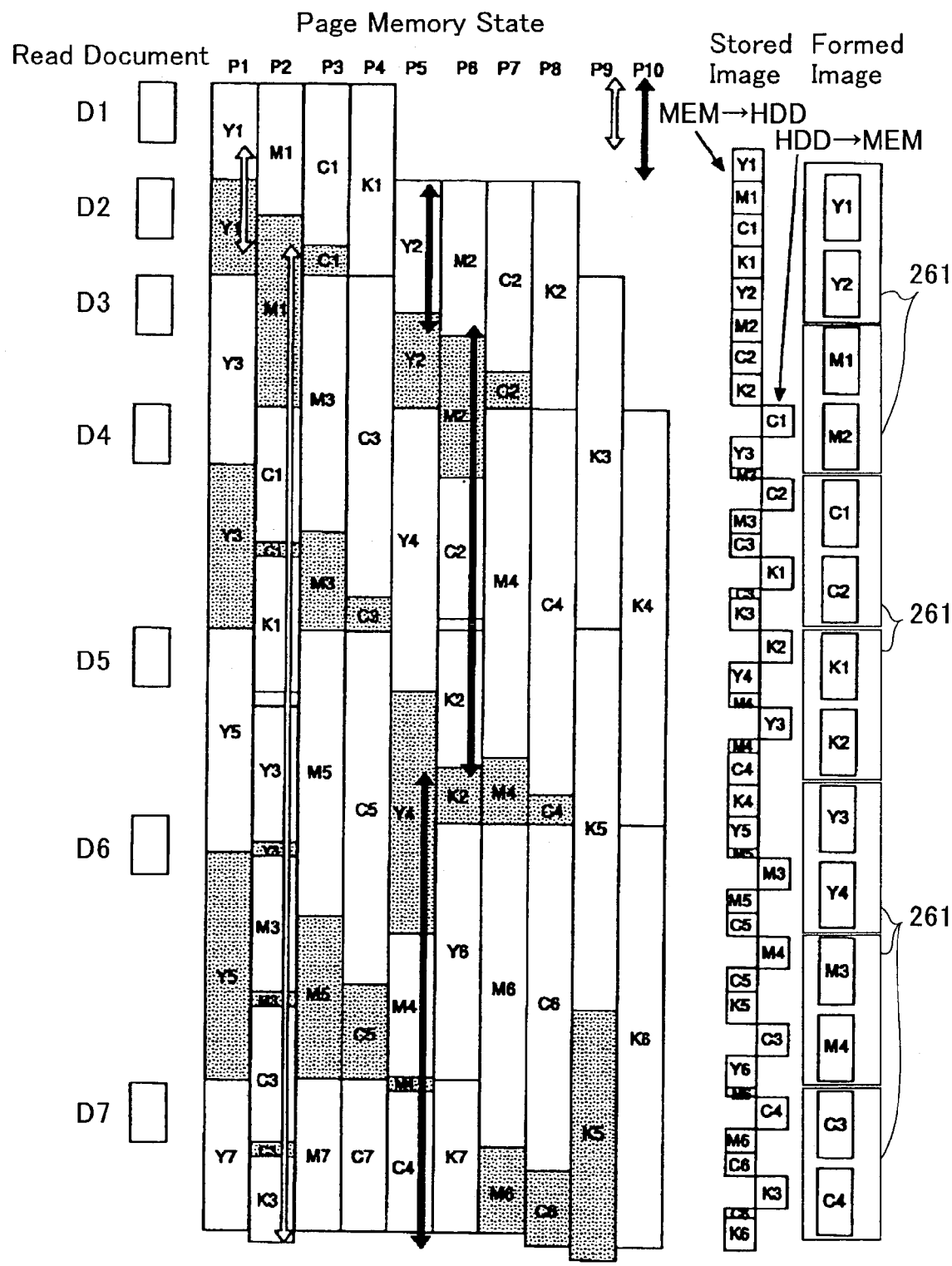
FIG. 24 is a diagram for explaining a page memory control in a 2-image mode of a fourth embodiment of the image forming apparatus according to the present invention.

FIG. 24 is a diagram for explaining a page memory control in the 2-image mode of this fourth embodiment of the image forming apparatus. FIG. 24 shows changes in a document reading state, a page memory state, a storage state to the storage means (second storage unit 207) such as the HDD, and an image forming state when 2 images are transferred onto the intermediate transfer belt 261 shown in FIG. 2. In FIG. 24, the time elapses in a downward direction. In addition, it is assumed for the sake of convenience that a full-color image is formed using the page memory having 10 pages P1 through P10.

It is assumed that both the data storage rate (speed) from the page memory to the storage means and the data transfer rate (speed) from the storage means to the page memory are higher than the linear speed with which the scanner section 1 shown in FIG. 1. It is also assumed that the storage of the image data from the page memory to the storage means is carried out after the reading of the corresponding document ends. In an initial state, pages P9 and P10 of the page memory are allocated as print-exclusive pages which are set exclusively for outputting the image data. Image data other than the image data read from the storage means are prohibited from being input to the print-exclusive pages of the page memory.

In FIG. 24, "Read Document" indicates the document which is being read by the scanner section 1, and "Page Memory State" indicates the state of the pages P1 through P10 of the page memory. "Stored Image" indicates the image data that is stored. The "Stored Image" includes "MEM->HDD" which indicates the image data that is stored (or transferred) from the page memory to the storage means, and "HDD->MEM" which indicates the image data that is stored (or transferred) from the storage means to the page memory. In addition, "Formed Image" indicates the image data that is transferred onto the intermediate transfer belt 261. Y1, . . . indicate the image data of the yellow component Y of the document D1, . . . . M1, . . . indicate the image data of the magenta component M of the document D1, . . . . C1, . . . indicate the image data of the cyan component C of the document D1, . . . . K1, . . . indicate the image data of the black component K of the document D1, . . . .

Accordingly, in the case shown in FIG. 24, the image data Y1, . . . of the yellow component Y are stored in the page P1 of the page memory. A shaded portion under the "Page Memory State" indicates the image data after being stored into the storage means. For example, when the image data Y1 under the "Stored Image" is stored from the page memory into the storage means as indicated under "MEM->HDD", the image data Y1 stored in the page P1 of the page memory under "Page Memory State" is simultaneously changed to a shaded portion to indicate the state of this image data Y1 after being stored into the storage means.

In FIG. 24, a white arrow indicates a first setting interval (or time) in which the print-exclusive page is set with respect to a first of the two images to be printed on the intermediate transfer belt 261 in the 2-image mode, and a bold black arrow indicates a second setting interval (or time) in which the print-exclusive page is set with respect to a second of the two images to be printed on the intermediate transfer belt 261 in the 2-image mode.

When the scanner section 1 starts reading the document D1, the image data Y1, M1, C1 and K1 are input to the pages P1, P2, P3 and P4 of the page memory, and the process of forming the first of the two images onto the intermediate transfer belt 261 in the 2-image mode is started.

First, the image data Y1 stored in the page P1 of the page memory is output to be transferred onto the intermediate transfer belt 261. Since the printing is made from the page P1, the allocation of the print-exclusive page of the page memory is changed from the page P9 to the page P1, as indicated by the white arrow in FIG. 24. In addition, the image data Y1, M1, C1 and K1 of the document D1 is stored in the storage means. The image data Y1, M1, C1 and K1 within the page memory is guaranteed until the storage of the image data Y1, M1, C1 and K1 into the storage means ends.

Then, the scanner section 1 starts to read the document D2. For example, the document D1 which is set in the reading position of the scanner section 1 can be switched to the next document D2 by a known automatic document feeder (ADF, not shown). The image data Y2, M2, C2 and K2 are input to the pages P5, P6, P7 and P8 of the page memory, and the process of forming the second of the two images onto the intermediate transfer belt 261 in the 2-image mode is started.

The image data Y2 stored in the page P5 of the page memory is output to be transferred onto the intermediate transfer belt 261. Since the printing is made from the page P5, the allocation of the print-exclusive page of the page memory is changed from the page P10 to the page P5, as indicated by the bold black arrow in FIG. 24.

Therefore, when forming the image data Y2 on the intermediate transfer belt 261, the pages P1 through P10 of the page memory are in the following states.

P1: Finished storing the image data Y1 into the storage means.

P2: Print-exclusive page because the image data M1 is being transferred onto the intermediate transfer belt 261.

P3: Finished storing the image data C1 into the storage means.

P4: Finished storing the image data K1 into the storage means.

P5: Outputting the image data Y2 and starting to store the image data Y2 into the storage means.

P6: Waiting to start storing the image data M2 into the storage means.

P7: Waiting to start storing the image data C2 into the storage means.

P8: Waiting to start storing the image data K2 into the storage means.

P9: Vacant (input of image data possible)

P10: Vacant (input of image data possible)

Accordingly, when the document to be read is switched from the document D2 to the next document D3 by the ADF, for example, it is possible to read this next document D3 by the scanner section 1 using the pages P1, P3, P4 and P9 of the page memory.

Next, the image data M1 is transferred onto the intermediate transfer belt 261. When forming the image data M1 onto the intermediate transfer belt 261, the image data M1 is already stored in the storage means, but the image data M1 is still stored in the page P2 of the page memory. Hence, the allocation of the print-exclusive page is changed from the page P1 to the page P2 of the page memory as indicated by the white arrow in FIG. 24. Similarly, when forming the image data M2 onto the intermediate transfer belt 261, the allocation of the print-exclusive page is changed from the page P5 to the page P6 of the page memory as indicated by the bold black arrow.

The image data C1 is transferred onto the intermediate transfer belt 261 after transferring the image data M2 onto the intermediate transfer belt 261. In this case, the image data C1 is already stored in the storage means, and further, the image data C1 is no longer stored in the page memory. Hence, the image data C1 is first transferred from the storage means to the page memory and then read from the page memory. In this case, the page P2 of the page memory is allocated as the print-exclusive page of the page memory, and the image data C1 from the storage means is read into the print-exclusive page P2. In other words, the image data from the storage means is read into one of the 2 print-exclusive pages of the page memory allocated first as the print-exclusive page.

The pages of the page memory other than the print-exclusive pages become vacant depending on the storage of the image data from the page memory to the storage means and depending on the start of the reading of the next document by the scanner section 1 responsive to the switching of the document by the ADF, for example. Hence, in the case shown in FIG. 24, the pages P5, P7, P8 and P10 become vacant approximately at the time when transferring the image data M2 onto the intermediate transfer belt 261. In this state, the document D4 is being read by the scanner section 1.

Next, when transferring the image data C2 onto the intermediate transfer belt 261, the image data C2 is no longer stored in the page memory. Hence, the image data C2 from the storage means is read into the print-exclusive page P6 of the page memory.

Therefore, the pages of the page memory are managed so that 2 print-exclusive pages are allocated in the 2-image mode. The image data to be printed and not stored in the page memory are read into the print-exclusive pages (2 pages) of the page memory which are determined according to the rule described above, from the storage means, and the remaining pages (8 pages) of the page memory are used to store the image data of the read document.

The allocation of the print-exclusive pages of the page memory enables simultaneous input and output to the page memory, while efficiently utilizing the limited number of pages of the page memory and positively acquiring the required number of pages for input and output, in the full-color image forming apparatus which uses a plurality of pages of the page memory for one input/output request. The utilization efficiency of the pages of the page memory can further be improved by dynamically allocating the print-exclusive pages by a setting means (or section).

As described above, the page of the page memory, storing the image data to be printed, is allocated for the print-exclusive page. In other words, the page of the page memory, to which storage of the image data to be printed is completed, is allocated for the print-exclusive page. This allocation of the print-exclusive-page introduces no problem when the transfer of the image data to the storage means is carried out immediately after the image data is stored in the page memory and the storage of the image data from the page memory into the storage means is completed by the time the printing of the image data is completed.

Figure 25:
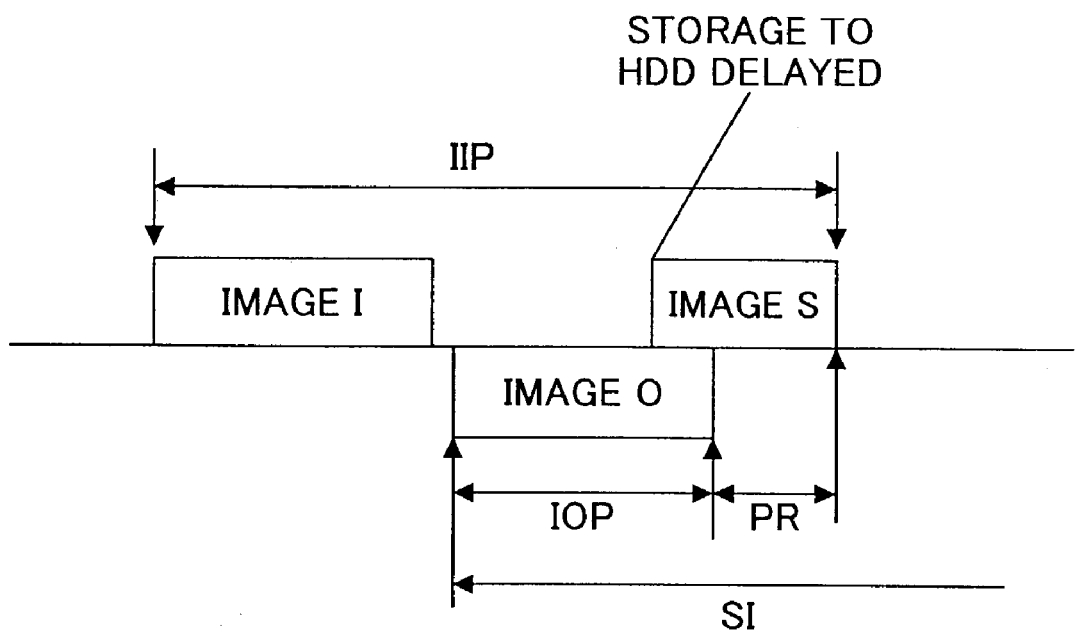
FIG. 25 is a diagram for explaining a state where storage to a storage means is delayed during an image data input process.

However, in a case where there is a delay from the time when the image data is stored in the page memory until the time when the image data from the page memory is transferred and stored in the storage means, the printing of the image data will be completed before the storage of the image data from the page memory into the storage means is completed, as shown in FIG. 25. As a result, the storage of the image data from the page memory into the storage means will be continued even after the printing of the image data is completed.

FIG. 25 is a diagram for explaining a state where storage to the storage means is delayed during an image data input process. FIG. 25 shows the timings of an input image data IMAGEI input to the page memory, an output image data IMAGEO output from the page memory, and an image data storage IMAGES from the page memory into the storage means during the image data input process IIP. In FIG. 25, IOP indicates an interval in which an image output process IOP is carried out, and SI indicates a setting interval (or time) in which the print-exclusive page is set. In addition, PR denotes a prohibited region where the printing of the image data is prohibited.

In the case shown in FIG. 25, even when the allocation of the print-exclusive pages of the page memory is made or the allocation is changed, and an attempt is made to use the allocated print-exclusive page to read the image data from the storage means into the page memory, the allocated print-exclusive page cannot be used because the image data stored therein is being transferred to the storage means. In other words, the allocated print-exclusive page cannot be used in this case because the image data input process IIP is still in progress.

If the page memory includes other vacant pages which may be allocated for the print-exclusive pages, it is possible to make such an allocation. However, the full-color image forming apparatus requires a large number of pages of the page memory for input and output, and vacant pages are less likely to exist in the page memory when the input and output to and from the page memory are made in parallel. Consequently, when the print-exclusive pages cannot be acquired in the 2-image mode, the necessary preparations for transferring the image data onto the intermediate transfer belt 261 is delayed, thereby causing color irregularities and the like in the image transferred onto the intermediate transfer belt 261. For example, the color irregularities are generated when positions of the same image but of different color components on the intermediate transfer belt 261 do not match.

Accordingly, when the image data is stored in the page memory but the storage of the image data from the page memory into the storage means is not completed, that is, when the image input process IIP is in progress, it is desirable to prohibit the concerned pages of the page memory from being allocated for the print-exclusive pages. In this case, it is possible to prevent the acquisition of the allocated print-exclusive page from being put on hold (wait) in the 2-image mode, and it is possible to allocate and acquire the print-exclusive page which can positively be used for the preparation of the image data transfer onto the intermediate transfer belt 261. In other words, by preventing the allocation of the print-exclusive page from being changed to the page of the page memory to which the image input process IIP is in progress, it is possible to execute the output (print) request using the print-exclusive page originally existing in the page memory, even when the output (print) request is generated during the storage of the image data to the storage means from the page of the page memory to which the image input process IIP is in progress.

Figure 26:
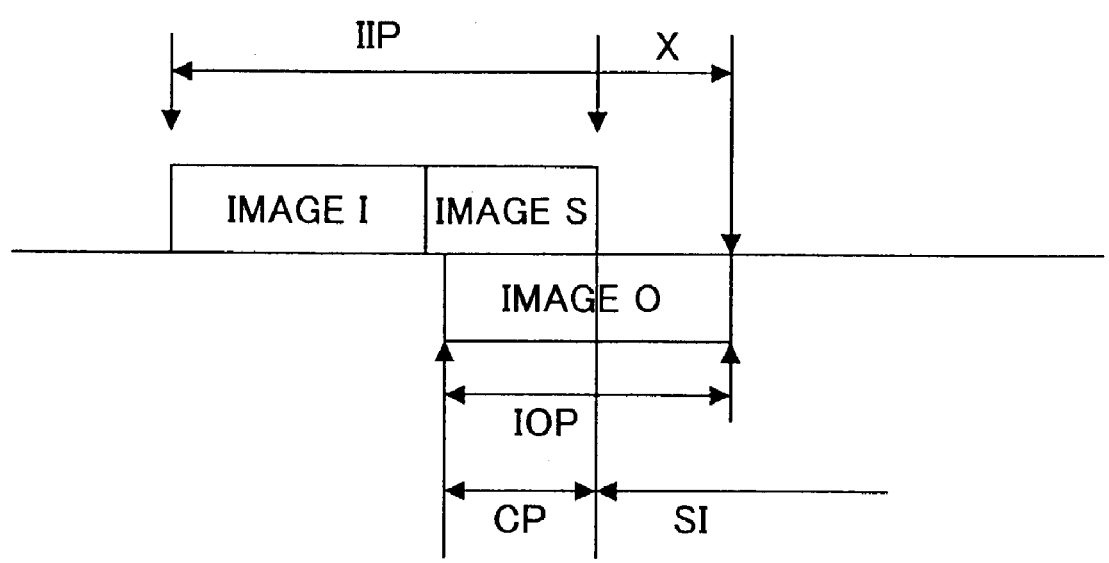
FIG. 26 is a diagram for explaining a state where an allocation of a print-exclusive page is prohibited and another page of the page memory is allocated during the image data input process.

FIG. 26 is a diagram for explaining a state where an allocation of a print-exclusive page is prohibited and another page of the page memory is allocated during the image data input process. In FIG. 26, the same designations are used as in FIG. 25. When the page of the page memory to which the image data input process IIP is in progress is prohibited from being allocated for the print-exclusive page and the print-exclusive page is to be allocated and acquired, the number of pages of the page memory usable by the image data input process IIP decreases due to the pages allocated for the print-exclusive pages and for the output. As a result, the possibility that the acquisition of the pages of the page memory for the image input process IIP fails increases, thereby restricting the image input process IIP. Therefore, in this case, it is desirable to change the allocation of the print-exclusive page of the page memory to the pages which may be acquired, depending on the change in the state of use of the pages of the page memory, from the point of view of improving the utilization efficiency of the limited number of pages of the page memory.

Thus, in FIG. 26, the setting interval SI in which the print-exclusive page is allocated starts immediately after the output of the output image data IMAGEO output from the page memory ends. As a result, even in a case where the page of the page memory to which the image input process IIP is being carried out is prohibited from being allocated for the print-exclusive page, this page can be allocated for the print-exclusive page in a region X immediately after the image input process IIP ends in FIG. 26, thereby improving the utilization efficiency of the pages of the page memory.

It is, however, inefficient in some cases to allocate the print-exclusive page of the page memory depending on the state of use of all of the pages of the page memory. Hence, it is preferable to allocate the print-exclusive page of the page memory in at least one of the following cases (c1) and (c2) where the state of use of the pages of the page memory changes and it is most efficient from the point of view of confirming the possible allocation of the print-exclusive page.

Case (c1): When the use of the page memory of the page memory by the image input process IIP ends.

Case (c2): When the acquisition of the page of the page memory by the image output process IOP starts.

The cases (c1) and (c2) above may be seen from FIG. 26. In FIG. 26, CP indicates an interval in which the change of the allocation of the print-exclusive page of the page memory is prohibited. In the region X, the use of the page memory by the image input process IIP has ended, and the page is used only for the output (printing).

Hence, the pages in the page memory can be allocated for the print-exclusive page in this region X. The print-exclusive page in the unused state and originally existing in the page memory is released, and the allocation of the print-exclusive page may be changed to the page of the page memory to which the allocation may be made in the region X.

Even though the allocation of the print-exclusive page of the page memory is prohibited during the image input process IIP, the print-exclusive page may be allocated when an output request of a new image data is generated. By changing the allocation of the print-exclusive page from the unused print-exclusive page to the page of the page memory from which the output (printing) is being made, the unused print-exclusive page which is released may then be used by the image input process IIP.

Figure 27:
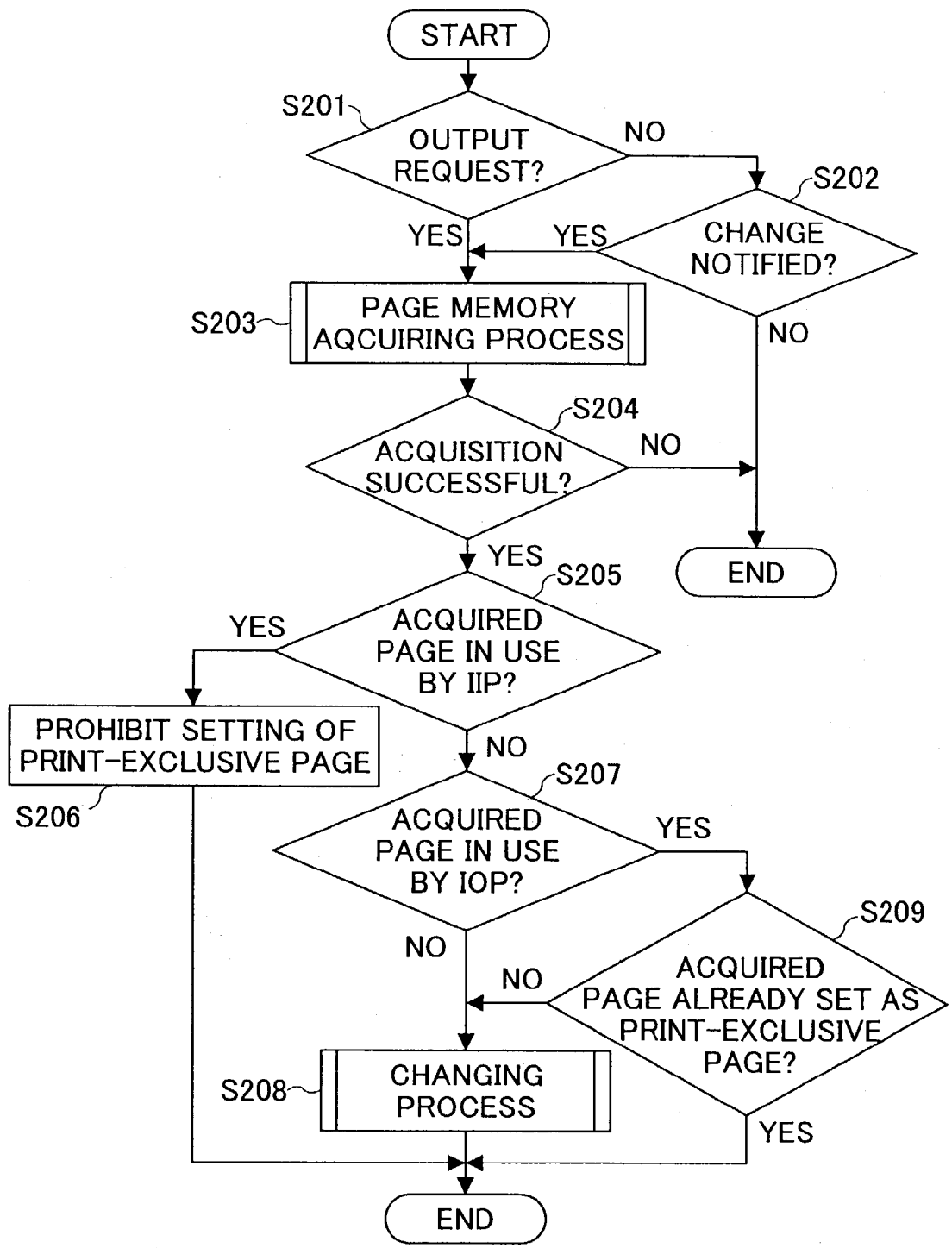
FIG. 27 is a flow chart for explaining a changing process which changes a setting of the print-exclusive page.

FIG. 27 is a flow chart for explaining a changing process which changes a setting or allocation of the print-exclusive page. The changing process is carried out by the CPU 68 shown in FIG. 5.

In FIG. 27, a step S201 decides whether or not an output request exists. If the decision result in the step S201 is NO, a step S202 decides whether or not the CPU 68 is notified of a change in the state of use of the pages of the page memory. The process ends if the decision result in the step S202 is NO.

On the other hand, if the decision result in the step S201 or S202 is YES, a step S203 carries out a page memory acquiring process for output. Then, a step S204 decides whether or not the acquisition of the page of the page memory for output was successful, and the process ends if the decision result in the step S204 is NO.

If the decision result in the step S204 is YES, a step S205 decides whether or not the acquired page of the page memory is in use by the image input process IIP. If the decision result in the step S205 is YES, a step S206 prohibits the setting (allocation) of the print-exclusive page from being changed, and the process ends. On the other hand, if the decision result in the step S205 is NO, a step S207 decides whether or not the acquired page of the page memory is in use by the image output process IOP.

If the decision result in the step S207 is YES, a step S209 decides whether or not the acquired page of the page memory is already set (allocated) for the print-exclusive page. The process ends if the decision result in the step S209 is YES. On the other hand, if the decision result in the step S207 or S209 is NO, a step S208 carries out a changing process to change the setting (allocation) of the print-exclusive page of the page memory to allocate the acquired page as the print-exclusive page, and the process ends.

Figure 28:
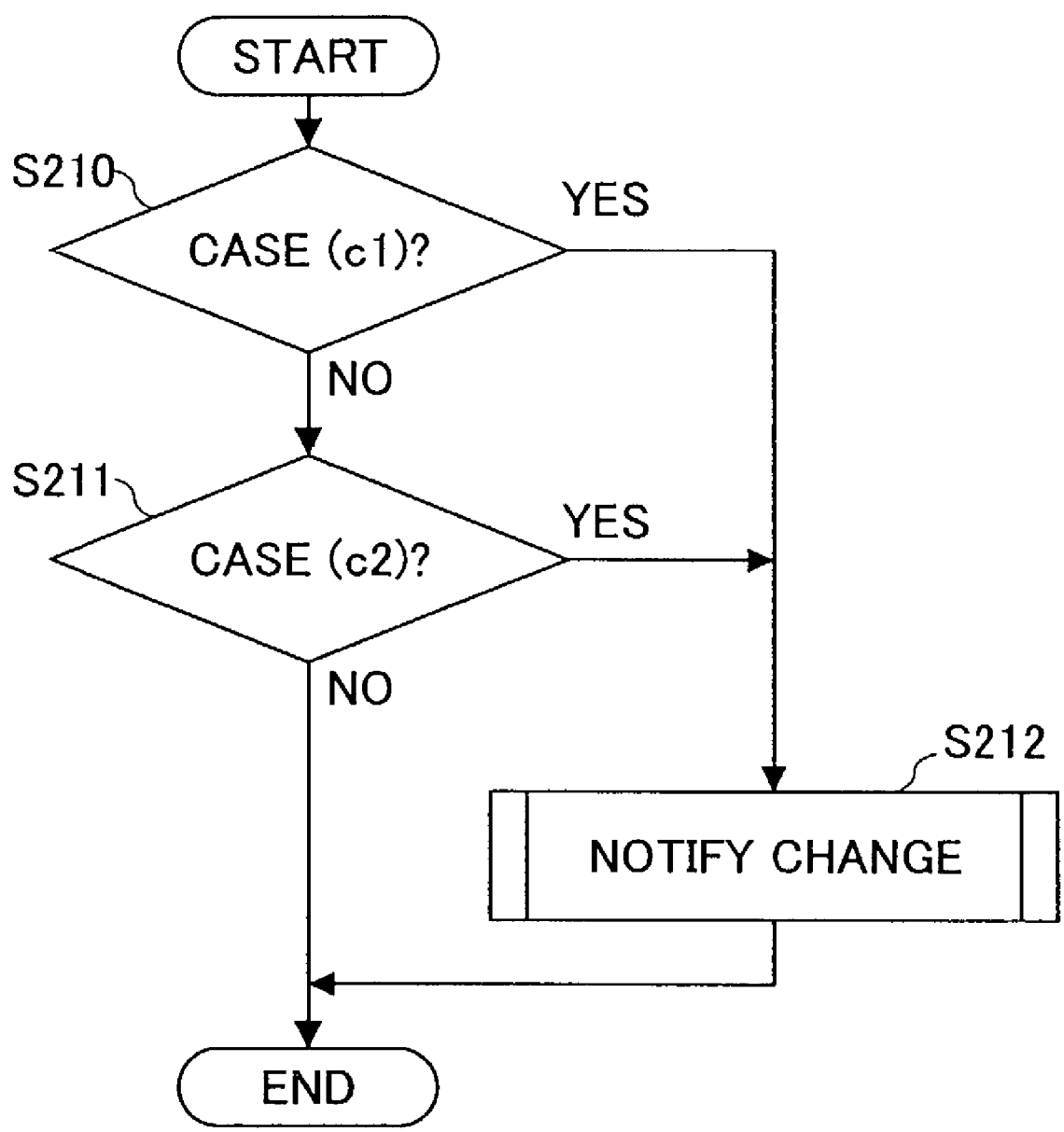
FIG. 28 is a flow chart for explaining a process of notifying a change in page usage of the page memory.

FIG. 28 is a flow chart for explaining a process of notifying a change in page usage of the page memory. It is inefficient in some cases to allocate the print-exclusive page of the page memory depending on the state of use of all of the pages of the page memory. Hence, it is preferable to allocate the print-exclusive page of the page memory in at least one of the above described cases (c1) and (c2) where the state of use of the pages of the page memory changes and it is most efficient from the point of view of confirming the possible allocation of the print-exclusive page. The process shown in FIG. 28 is carried out by the CPU 68 shown in FIG. 5. In FIG. 28, a step S210 decides whether or not the case (c1) is satisfied, that is, the use of the page memory of the page memory by the image input process IIP ended. If the decision result in the step S210 is NO, a step S211 decides whether not the case (c2) is satisfied, that is, the acquisition of the page of the page memory by the image output process IOP started. The process ends if the decision result in the step S211 is NO. On the other hand, if the decision result in the step S210 or S211 is YES, a step S212 carries out a process of notifying a change in page usage of the page memory to the CPU 68, and the process ends.

By controlling the page acquisition of the page memory in the above described manner, it is possible to prevent a case where the pages of the page memory cannot be acquired for the image data Y, M, C and K during the full-color printing in the 2-image mode, and to prevent a case where the page acquisition is delayed. As a result, it is possible to input and output the image data to and from the page memory in parallel by efficiently utilizing the pages of the page memory.

Next, a description will be given of a case where an anticipated document size to be processed in the image forming apparatus using the page memory is a small size, but the actual document size to be processed is a large size. For example, the small size is the A4-size, and the large size is the A3-size. It is assumed for the sake of convenience that only 1 image can be transferred onto the intermediate transfer belt 261, that is, the image is printed in the 1-image mode.

Figure 29:
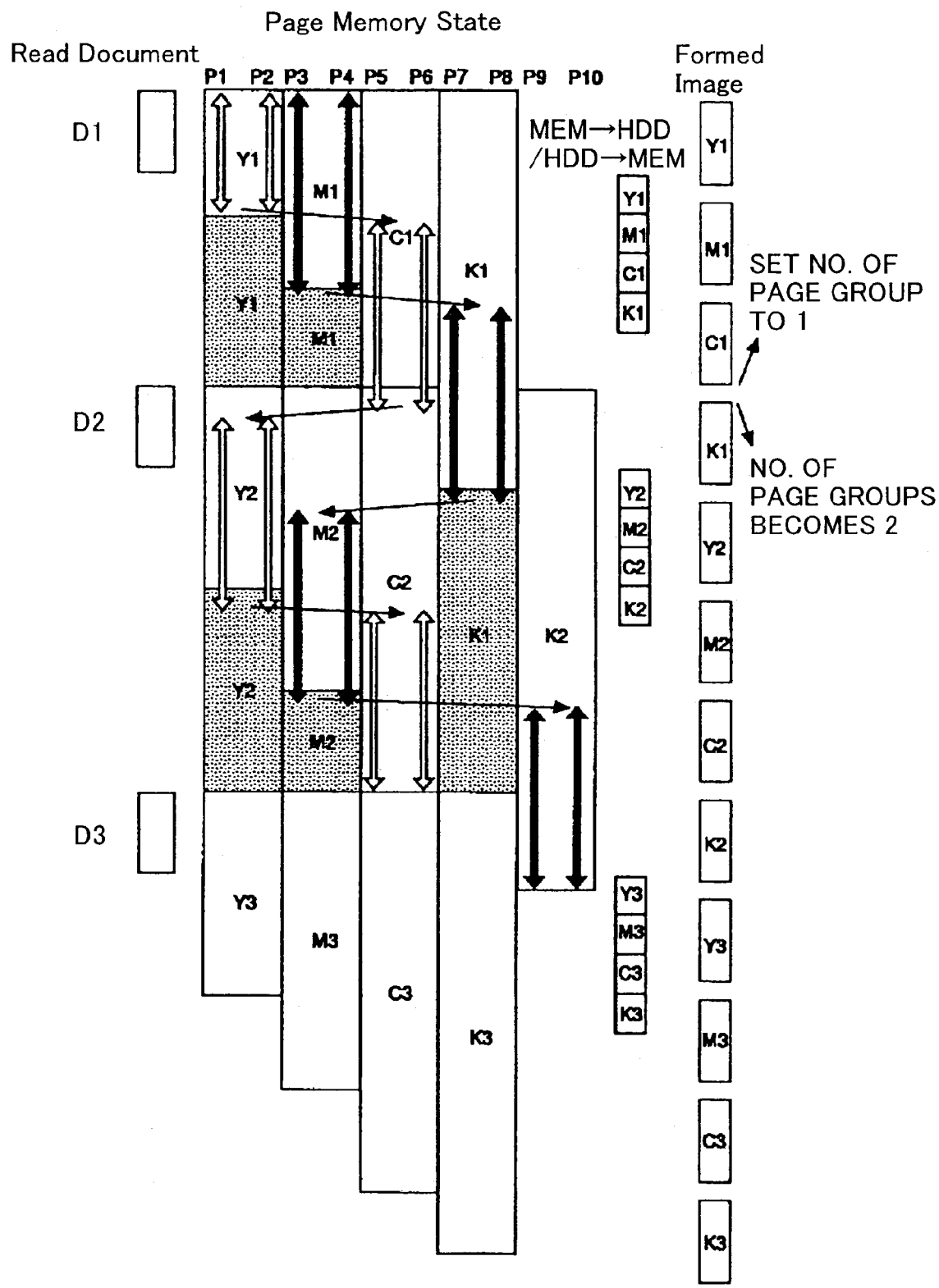
FIG. 29 is a diagram for explaining a page memory control in an 1-image mode.

FIG. 29 is a diagram for explaining a page memory control in the 1-image mode. In FIG. 29, the same designations are used as in FIG. 24. Since the image data cannot be stored within 1 page of the page memory, 2 consecutive pages are regarded as 1 frame, and the image data input process IIP to the page memory is carried out by acquiring 4 frames (9 pages).

In the initial state, it is assumed for the sake of convenience that the pages P9 and P10 of the page memory are allocated for the print-exclusive page pair, that is, 1 print-exclusive frame. In addition, it is assumed that the image data to be transferred onto the intermediate transfer belt 261 is prepared (the print-exclusive pages are allocated) when triggered by the start of the transfer of the previous image data onto the intermediate transfer belt 261.

First, when the scanner section 1 starts to read the document D1, the transfer o-f the image data Y1 onto the intermediate transfer belt 261 is started in FIG. 29. In this case, the pages P1 and P2 of the page memory are allocated for the print-exclusive page pair pp1.

Because the preparation of the next image data to be transferred onto the intermediate transfer belt 261 is triggered by the start of the transfer of the image data Y1 onto the intermediate transfer belt 261, the pages P3 and P4 of the page memory which store the image data M1 are allocated for the print-exclusive page pair pp2. Triggered by the start of the transfer of the image data M1 onto the intermediate transfer belt 261, the pages P5 and P6 of the page memory which store the next image data C1 are allocated for the print-exclusive page pair pp1. Triggered by the start of the transfer of the image data C1 onto the intermediate transfer belt 261, the next image data K1 is prepared. However, since the image data K1 is the last color component to the transferred onto the intermediate transfer belt 261 for the document D1, the 2 print-exclusive page pairs pp1 and pp2 which exist at the end of the transfer of the image data C1 onto the intermediate transfer belt 261 is reduced to 1 print-exclusive page pair.

In other words, when the transfer of the image data C1, which is prior to the last color component to be transferred for the document D1, onto the intermediate transfer belt 261 is completed, the 2 existing print-exclusive page pairs are reduced to 1 print-exclusive page pair, so that 4 frames amounting to 8 pages are acquired. Hence, it is possible to read the next document D2 by the scanner section 1.

When the reading of the document is continued in the 1-image mode and the transfer of the image data K1 onto the intermediate transfer belt 261 is started, the next image data Y2 of the next document D2 is prepared. Hence, the reduced number of print-exclusive page pairs is increased from 1 to 2.

Suppose that, after full-color printing of a small image using the print-exclusive page pairs of the page memory, a large image is to be printed in full-color consecutively thereto.

Figure 30:
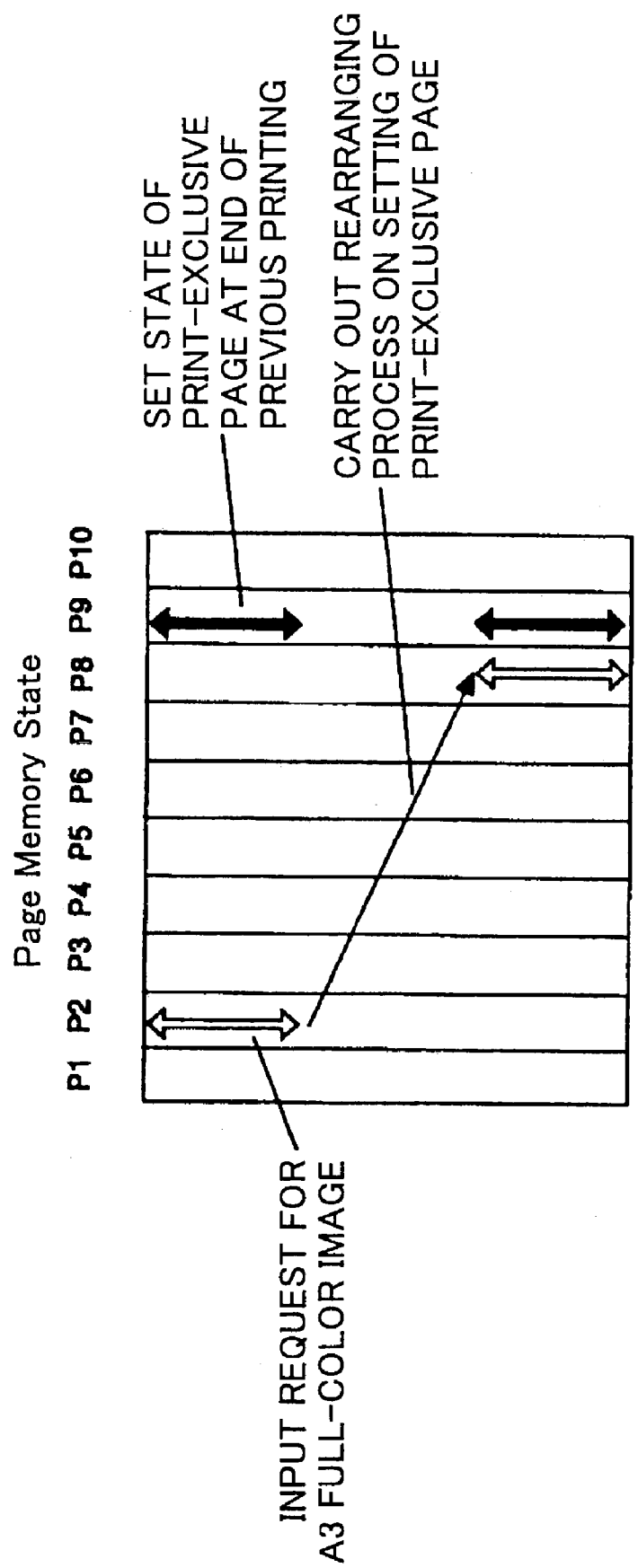
FIG. 30 is a diagram for explaining an arrangement of the print-exclusive pages after a full-color printing of a small image.

FIG. 30 is a diagram for explaining an arrangement of the print-exclusive pages after the full-color printing of the small image. In FIG. 30, the same designations are used as in FIG. 29. In the state shown in FIG. 30, the pages P2 and P9 of the page memory are allocated for the print-exclusive pages after the full-color printing of the small image is completed, and the full-color printing of the large image is to be made consecutively thereto from this state.

As described above, in the case of the A3-size full-color image data, the image data of each color component cannot be stored within 1 page of the page memory, and 2 consecutive pages of the page memory are required. Hence, 4 frames amounting to 8 pages of the page memory are acquired before storing the image data of the four color components into the page memory.

With the exception of the pages P2 and P9 which are allocated for the print-exclusive pages of the page memory, 8 vacant pages P1, P3, P4, P5, P6, P7, P8 and P10 exist in the page memory. However, the allocation of the print-exclusive pages is not optimum, and it is impossible to obtain 4 page pairs respectively made up of 2 consecutive pages of the page memory. Therefore, in this particular case, the image data of the large image cannot be stored in the page memory unless a rearranging process is carried out to optimize the arrangement of the print-exclusive pages of the page memory prior to printing the large image in full-color.

In the case shown in FIG. 30, the rearranging process to optimize the arrangement of the print-exclusive pages of the page memory cannot be carried out to satisfaction when no consideration is made with respect to the grouping of the pages. In other words, FIG. 30 shows an arrangement of the print-exclusive pages which cannot be adapted to the storage of the image data of the full-color large image when no consideration is made with respect to the grouping of the pages.

Hence, in a modification of the fourth embodiment described hereunder, the rearranging process to optimize the arrangement of the print-exclusive pages of the page memory is carried out by taking into consideration the grouping of the pages of the page memory. For example, if pages P1 through P6 exist in the page memory and the page P2 is allocated for the print-exclusive page, the print-exclusive page is rearranged and optimized so as to suit combination patterns P1-P2, P3-P4 and P5-P6 which respectively indicate a page group. The page group in this case is formed by a consecutive page pair of the page memory. Hence, in order to optimize the arrangement of the print-exclusive page of the page memory, combination patterns such as P2-P3, P4-P5 are not used.

In other words, the pages of the page memory are grouped into page groups each made up of 2 consecutive pages, and the combination patterns of the pages are formed so that a maximum number of page groups is obtainable for the page memory. By making the number of page groups a maximum, it is possible to maximize the number of pages of the page memory that may be acquired. Generally, in the case of the image data which requires n pages of the page memory, n consecutive pages are regarded as 1 page group, and the combination patterns of the pages are formed so that a maximum number of page groups is obtainable for the page memory.

In this modification, the rearranging process to optimize the arrangement of the print-exclusive pages of the page memory is carried out in the following manner. First, the print-exclusive pages of the page memory are arranged consecutively. In addition, the setting or allocation of the print-exclusive pages of the page memory is made by taking into consideration the grouping of the pages. The setting or allocation of the print-exclusive pages of the page memory is optimized prior to the page memory acquiring process for input or output. Furthermore, the rearranging process is carried out when the state of use of the pages of the page memory changes, and the rearranging process is carried out in real-time based on the most recent state of use of the pages of the page memory.

On the other hand, if the required pages of the page memory cannot be acquired by the page memory acquiring process for input or output in the present state of use of the pages of the page memory, a plurality of preprocessings H1 and H2 are carried out in order to continue the acquisition of the pages. These preprocessings H1 and H2 are carried out to create usable pages of the page memory by manipulating the image data stored in the page memory when the acquisition of the pages of the page memory is impossible as it is in the present state. The rearranging process is carried out with highest priority prior to these preprocessings H1 and H2.

H1: Since an overwrite can be made with respect to the page memory, a page of the page memory is regarded usable when the image input process IIP with respect to this page ends.

H2: When a merging image data which is in the process of being merged exists in the page memory when merging a plurality of document images to printing a merged image on a single recording paper, the merging image data is temporarily saved in the storage means by a save process if the merging of the image data is not yet completed, so as to vacate pages of the page memory occupied by the merging image data.

By taking the above described measures, it is possible to avoid the case shown in FIG. 30 where the acquisition of the pages of the page memory is impossible due to inappropriate arrangement of the print-exclusive pages.

Figure 31:
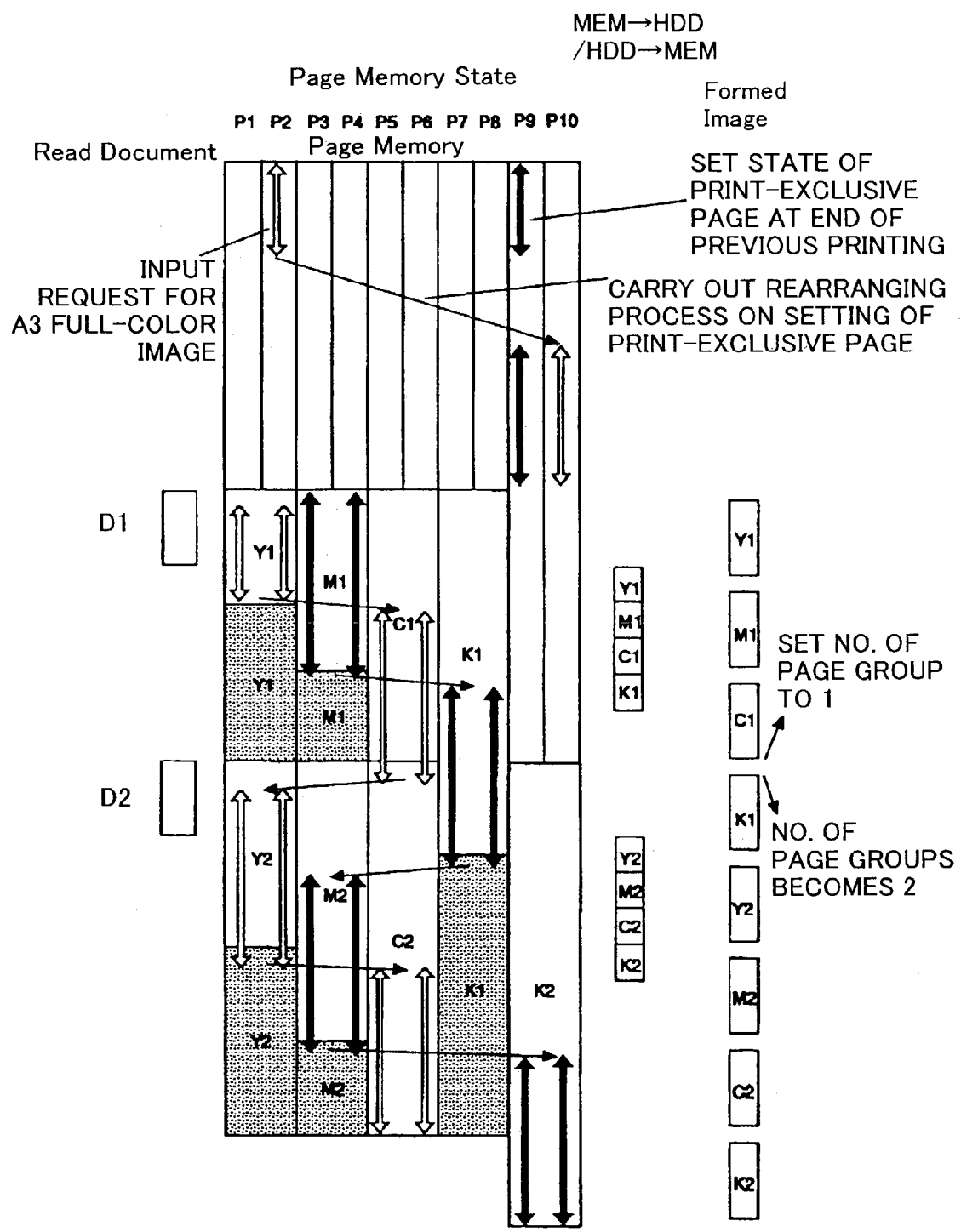
FIG. 31 is a diagram for explaining an arrangement of the print-exclusive pages for a full-color printing of small to large images.

FIG. 31 is a diagram for explaining an arrangement of the print-exclusive pages for a full-color printing of small to large images, when taking the above described measures of this modification. In FIG. 31, the same designations are used as in FIGS. 24 and 29.

In FIG. 31, the arrangement of the print-exclusive pages of the page memory is optimized by taking into consideration the above described grouping of the pages of the page memory, prior to acquiring the pages of the page memory for input and output. As a result, it may be seen from FIG. 31 that the acquisition of the pages of the page memory for input is successful even when the input request of an A3-size full-color image data is generated.

Initially, the pages P9 and P2 of the page memory are allocated for the print-exclusive pages in FIG. 31. When the input request of the A3-size full-color image data is generated, the allocation of the print-exclusive page P2 is changed to page P10, so that the A3-size full-color image data can be input to the page memory.

Figure 32:
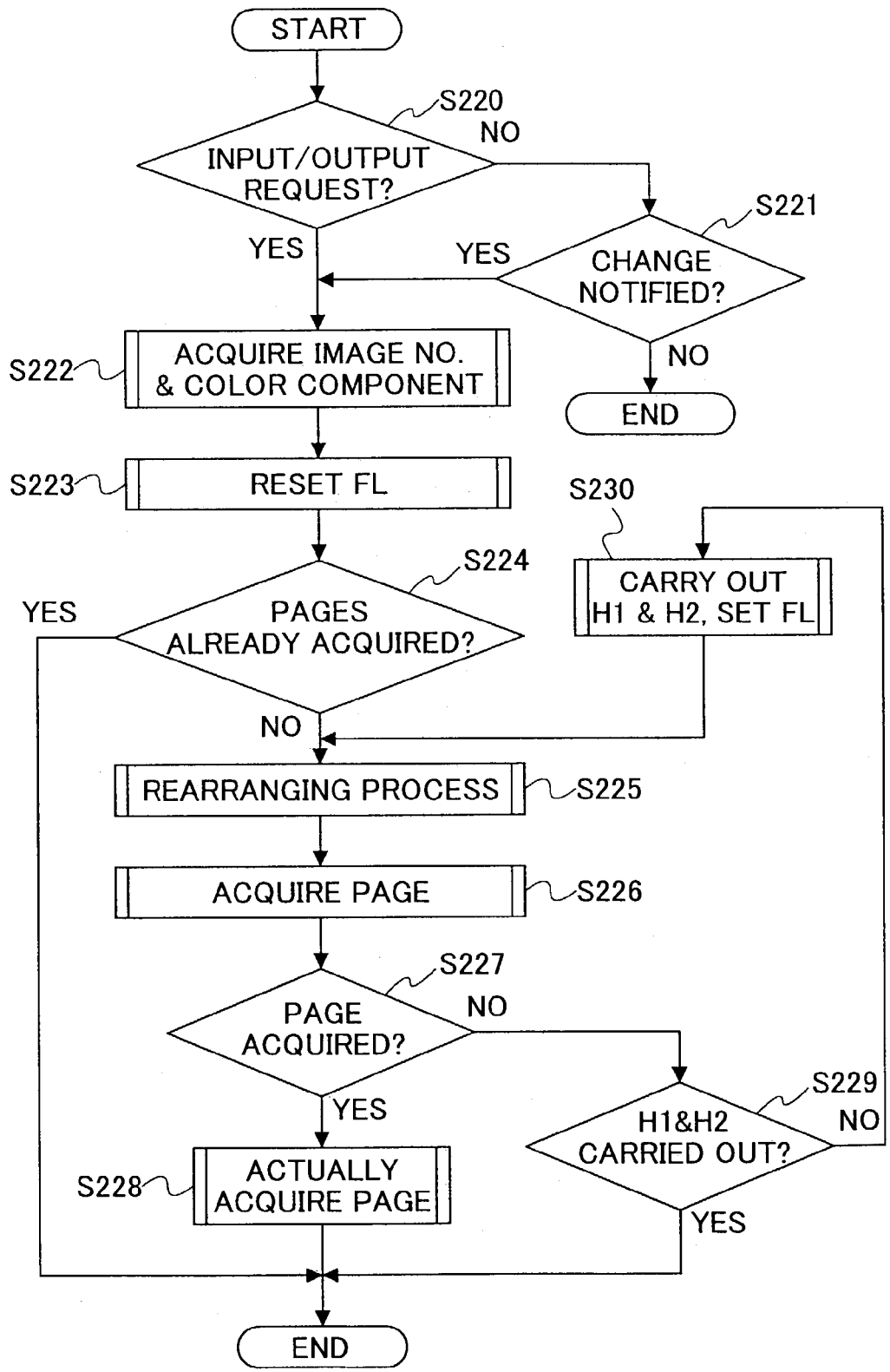
FIG. 32 is a flow chart for explaining a page memory acquiring process.

FIG. 32 is a flow chart for explaining a page memory acquiring process of this modification. The page memory acquiring process shown in FIG. 32 is carried out by the CPU 68 shown in FIG. 5.

In FIG. 32, a step S220 decides whether or not an input request or an output request (input/output request) of the image data is made with respect to the page memory. If the decision result in the step S220 is NO, a step S221 decides whether or not the CPU 68 is notified of a change in the state of use of the pages of the page memory. The process ends if the decision result in the step S221 is NO. On the other hand, if the decision result in the step S220 or S221 is YES, the process advances to a step S222.

The step S222 acquires the image number and the color component of the image data for which the input/output request is made. A step S223 resets a flag FL which indicates that the preprocessings H1 and H2 described above have been made for the page memory acquisition. A step S224 decides whether or not a number of pages of the page memory is already acquired by the image data having the image number requested by the input/output request, and the process ends if the decision result in the step S224 is YES.

If the decision result in the step S224 is NO, a step S225 carries out a rearranging process to optimize the arrangement of the print-exclusive pages of the page memory. A step S226 acquires the pages of the page memory for input or output of the image data requested by input/output request.

Hence, the pages of the page memory for input or output are acquired each time after optimizing the arrangement of the print-exclusive pages of the page memory. Hence, the possibility of being able to acquire the pages of the page memory for input or output of the image data requested thereafter increases, thereby improving the utilization efficiency of the page memory.

After the step S226, a step S227 decides whether or not the required pages of the page memory are acquired. If the decision result in the step S227 is YES, a step S228 actually acquires the pages acquired in response to the input/output request by the image number of the requested image data, and the process ends. On the other hand, if the decision result in the step S227 is NO, a step S229 decides whether or not the preprocessings H1 and H2 have been carried out, by judging whether or not the flag FL is set, and the process ends if the decision result in the step S229 is YES. On the other hand, if the decision result in the step S229 is NO, a step S230 carries out the preprocessings H1 and H2 and sets the flag FL, and the process returns to the step S225.

In this modification, the step S225 carries out the rearranging process before the step S230 carries out the preprocessings H1 and H2.

In the step S230, the preprocessing H1 overwrites with respect to the image data stored in the page memory. Hence, when using the image data which was stored in the page memory before the overwrite took place, it is necessary to read the image data again from the storage means into the page memory. Furthermore, the preprocessing H2 temporarily saves the merging image data in the storage means. Hence, when continuing the merging of the image data, it is necessary to read the saved image data again from the storage means into the page memory.

On the other and, in the step S225, the rearranging process merely reallocates the print-exclusive pages of the page memory, and does not require additional processing with respect to the image data. For this reason, the rearranging process which is carried out at the timing shown in FIG. 32 enables the page memory acquiring process to be carried out more efficiently.

In the page memory acquiring process shown in FIG. 32, the step S222 and the subsequent steps are carried out also when the decision result in the step S221 is YES. This is in order to optimize the allocation of the print-exclusive page of the page memory in cases where the page of the page memory is acquired for the input or output or the page of the page memory is released by the end of the input or output, so that the optimum allocation of the print-exclusive page is made with respect to the most recent state of use of the page memory. The effect of acquiring the page of the page memory is large particularly when the step S222 and the subsequent steps are carried out at the timing when the page is released.

Figure 33:
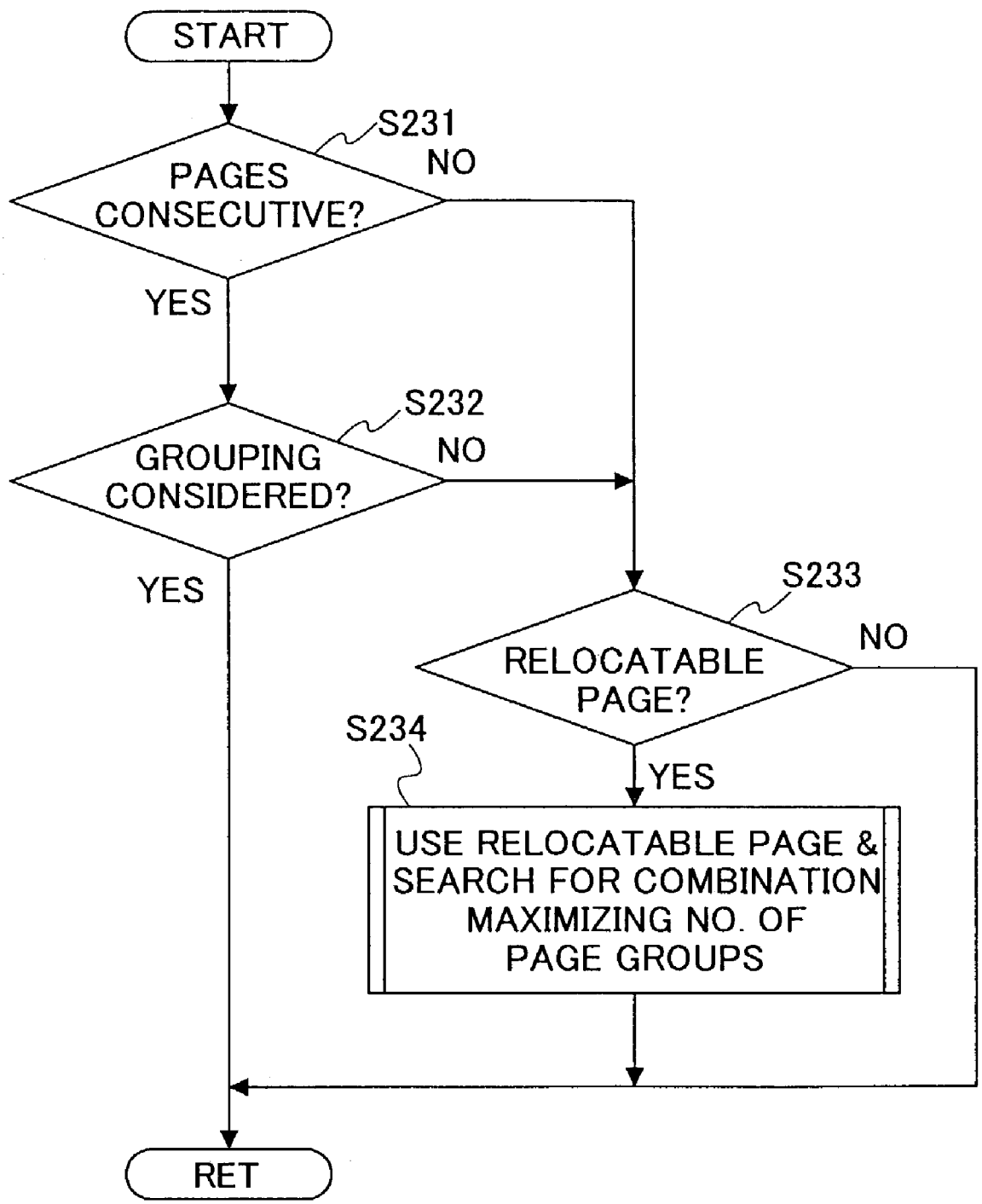
FIG. 33 is a flow chart for explaining a rearranging process for optimizing a print-exclusive page arrangement during the page memory acquiring process.

Next, a more detailed description will be given of the rearranging process of the step S225 shown in FIG. 32, by referring to FIG. 34. FIG. 33 is a flow chart for explaining the rearranging process of the step S225 for optimizing the print-exclusive page arrangement during the page memory acquiring process.

In FIG. 33, a step S231 decides whether or not the print-exclusive pages of the page memory are consecutively arranged. If the decision result in the step S231 is YES, a step S232 decides whether or not the print-exclusive pages of the page memory are arranged by taking into consideration the grouping of the pages which maximizes the number of page groups in the page memory. If the decision result in the step S232 is YES, the print-exclusive pages of the page memory are arranged with the optimum arrangement, and the process returns to the step S226 shown in FIG. 32.

On the other hand, if the decision result in the step S231 or S232 is NO, a step S233 decides whether or not a relocatable or unused print-exclusive page of the page memory exists. The process returns to the step S226 shown in FIG. 32 if the decision result in the step S233 is NO. If the decision result in the step S233 is YES, a step S234 uses the relocatable or unused print-exclusive page of the page memory and searches for the combination patterns and the combination of the page groups which maximize the number of page groups in the page memory, and the process returns to the step S226 shown in FIG. 32.

Therefore, by managing the pages of the page memory in the above described manner of the fourth embodiment and modification thereof in the 1-image mode of the image forming apparatus, it is possible to prevent a case where the pages of the page memory cannot be acquired for the image data Y, M, C and K during the full-color printing in the 1-image mode, and to prevent a case where the page acquisition is delayed. As a result, it is possible to input and output the image data to and from the page memory in parallel by efficiently utilizing the pages of the page memory.

Further, the present invention is not limited to these embodiments, but various variations and modifications may be made without departing from the scope of the present invention.

What is claimed is:

1. An image forming apparatus which forms an image on a recording medium by an image forming section based on image data output from a page memory, said page memory having a plurality of pages that are units with which the image data is stored in the page memory, each of the pages of said page memory having a predetermined size, said image forming apparatus comprising:

a page number calculating section configured to calculate a number of pages of the page memory required to store each of a plurality of color components representing a full-color image included in the image data in the page memory;

a judging section configured to judge whether or not the calculated number of pages calculated by said page number calculating section can be acquired in the page memory for all of the plurality of color components; and a page memory acquiring section configured to acquire the calculated number of pages of the page memory required to store the image data of one of the color components, and to reserve the number of pages of the page memory reciuired to store the image data of all remaining color components, if said judging section judges that the calculated number of pages can be acquired in the page memory for all of the color components.

2. The image forming apparatus as claimed in claim 1, wherein said page memory stores the image data which is input to said image forming apparatus, and outputs the image data which is to be formed on the recording medium by said image forming section.

3. The image forming apparatus as claimed in claim 1, wherein said page number calculating section calculates the number of pages of the page memory required to store the image data in the page memory based on a number of color components of the image data to be stored in the page memory.

4. The image forming apparatus as claimed in claim 1, wherein said page number calculating section calculates the number of pages of the page memory required to store the image data in the page memory is further based on a number of color components required to form the image by the image forming section using the image data output from the page memory.

5. The image forming apparatus as claimed in claim 1, wherein said page number calculating section calculates the number of pages of the page memory required to store the image data in the page memory is further based on a size of the image data.

6. The image forming apparatus as claimed in claim 1, wherein said page memory acquiring section holds acquisition of the calculated number of pages of the page memory required to store the image data in the page memory if said judging section judges that acquisition of the calculated number of pages is impossible.

7. The image forming apparatus as claimed in claim 1, further comprising:

a storage section configured to backup the image data stored in said page memory.

8. The image forming apparatus as claimed in claim 7, wherein said storage section is configured to store the image data stored in said page memory, and to output stored image data to said page memory to be supplied to said image forming section.

9. A memory control apparatus for managing pages of a page memory which has a plurality of pages that are units with which image data is stored in the page memory, each of the pages of said page memory having a predetermined size, comprising:

a page number calculating section configured to calculate a number of pages of the page memory required to store each of a plurality of color components representing a full-color image included in the image data in the page memory;

a judging section configured to judge whether or not a calculated number of pages calculated by said page number calculating section can be acquired in the page memory for all of the color components; and a page memory acquiring section configured to acquire the calculated number of pages of the page memory required to store the image data of one of the color components, and to reserve the number of pages of the page memory required to store the image data of all remaining color components, if said judging section judges that the calculated number of pages can be acquired in the page memory for all of the color components.

10. A memory control method for managing pages of a page memory which has a plurality of pages that are units with which an image data is stored in the page memory, each of the pages of said page memory having a predetermined size, comprising:

calculating a number of pages of the page memory required to store each of a plurality of color components representing a full-color image included in the image data in the page memory;

judging whether or not a calculated number of pages can be acquired in the page memory for all of the color components; and acquiring the calculated number of pages of the page memory required to store the image data of one of the color components, and reserving the number of pages of the page memory required to store the image data of all remaining color components, if said judging judges that the calculated number of pages can be acquired in the page memory for all of the color components.

11. The image forming apparatus as claimed in claim 1, further comprising:

a reserved page judging section configured to judge whether or not pages of the page memory have been reserved for the image data of the plurality of color components representing the full-color image, wherein said page memory acquiring section acquires a number of reserved pages of the page memory required to store the image data of one of the color components, if said reserved page judging section judges that the pages of the page memory have been reserved.

12. The memory control apparatus as claimed in claim 9, further comprising:

a reserved page judging section configured to judge whether or not pages of the page memory have been reserved for the image data of the plurality of color components representing the full-color image, wherein said page memory acquiring section acquires a number of reserved pages of the page memory required to store the image data of one of the color components, if said reserved page judging section judges that the pages of the page memory have been reserved.

13. The memory control method as claimed in claim 10, further comprising:

judging whether or not pages of the page memory have been reserved for the image data of the plurality of color components representing the full-color image, wherein said acquiring acquires a number of reserved pages of the page memory required to store the image data of one of the color components, if said judging whether or not pages of the page memory have been reserved judges that the pages of the page memory have been reserved.

* * * * *